United States Patent [19]

Shan et al.

[11] Patent Number: 5,325,525

[45] Date of Patent: Jun. 28, 1994

[54] METHOD OF AUTOMATICALLY CONTROLLING THE ALLOCATION OF RESOURCES OF A PARALLEL PROCESSOR COMPUTER SYSTEM BY CALCULATING A MINIMUM EXECUTION TIME OF A TASK AND SCHEDULING SUBTASKS AGAINST RESOURCES TO EXECUTE THE TASK IN THE MINIMUM TIME

[75] Inventors: Ming-Chien Shan, Saratoga; Marguerite C. Murphy, Berkeley, both of Calif.

[73] Assignee: Hewlett-Packard Company, Palo Alto, Calif.

[21] Appl. No.: 680,223

[22] Filed: Apr. 4, 1991

[51] Int. Cl.$^5$ ............................................. G06F 9/44
[52] U.S. Cl. ............................ 395/650; 364/DIG. 1; 364/230.3; 364/281.3; 364/281.6; 364/262.1
[58] Field of Search ................................ 395/650, 725

[56] References Cited

U.S. PATENT DOCUMENTS

| | | | |
|---|---|---|---|
| 3,614,745 | 10/1971 | Podvin | 364/DIG. 1 |
| 4,481,583 | 11/1984 | Mueller | 364/DIG. 1 |
| 4,769,772 | 9/1988 | Dwyer | 395/375 |
| 4,829,427 | 5/1989 | Green | 364/DIG. 1 |
| 5,091,852 | 2/1992 | Tsuchida et al. | 364/DIG. 1 |
| 5,093,912 | 3/1992 | Dong et al. | 364/DIG. 1 |

OTHER PUBLICATIONS

Murphy, Marguerite and Rotem, Doron; "Effective Resource Utilization for Multiprocessor Join Execution" pp. 67-75; Proceedings of the Fifteenth International Conference on Very Large Data Bases, Aug. 22-25, 1989.

Murphy, Marguerite and Rotem, Doron; "Processor Scheduling for Multiprocessor Joins" pp. 140-147; Proceedings Fifth International Conference on Data Engineering; Feb. 6-10, 1989.

Primary Examiner—Eddie P. Chan

[57] ABSTRACT

A method of controlling the allocation of resources in a parallel processor computer. A critical path for executing a task such as evaluating a database query is determined. The minimum time to execute the task assuming infinite resources such as processors and memory buffers is calculated. Resources are scheduled against subtasks so as to execute the task in the calculated minimum time. The number of resources would be required to meet the schedule is determined and if the computer has that many resources the schedule is carried out. Otherwise a revised execution time is calculated, preferably by using as a scaling factor the ratio between the number of required resources and the number of available resources. Then the schedule is adjusted so that the task can be executed in the revised time and the number of resources that would be required to meet the adjusted schedule is determined. If the computer has that many resources the schedule is carried out, otherwise the process is repeated. Preferably the process is halted if two iterations result in the same number of resources being needed.

13 Claims, 11 Drawing Sheets

METHOD OF AUTOMATICALLY CONTROLLING THE ALLOCATION OF RESOURCES OF A PARALLEL PROCESSOR COMPUTER SYSTEM BY CALCULATING A MINIMUM EXECUTION TIME OF A TASK AND SCHEDULING SUBTASKS AGAINST RESOURCES TO EXECUTE THE TASK IN THE MINIMUM TIME

BACKGROUND OF THE INVENTION

The present invention relates generally to electronic computers and more particularly to a method of controlling the allocation of resources such as processors and memory buffers in a parallel processor computer in executing a task such as evaluating a query of a database.

A typical parallel processor computer system has a plurality of resources such as processors, memory buffers and the like. These resources can operate simultaneously, thereby greatly improving the performance of the computer when executing a task which has a plurality of subtasks that can be executed independently of each other.

Executing a task usually involves executing a number of subtasks each of which in turn may have several parts. In a computer having only one processor, each step in executing each part of each subtask is performed sequentially. In a parallel processor computer, several such steps can be performed simultaneously, but typically the computer does not have enough resources to go around. Resolving conflicting demands by the various subtasks for access to such resources has been a problem in the design of parallel processor computer systems, especially in the context of using such computer systems to evaluate complicated queries of a database.

Various kinds of parallel-processor database computer architectures have been proposed. See, for example, Ozkarahan, *Database Machines and Database Management*, Prentice-Hall, 1986; DeWitt et al., "A Single-User Performance Evaluation of the Teradata Database Machine", Technical Report No. DB-081-87, MCC, Mar. 5, 1987; and The Tandem Performance Group, "A Benchmake of Non-Stop SQL on the Debit Credit Transaction", ACM SIGMOD, Chicago, 1988. A principal design goal is to maximize parallelism in such computers. Carey et al., "Parallelism and Concurrency Control Performance in Distributed Database Machines", ACM SIGMOD, Portland, Oreg., 1989.

Most of the proposed architectures for parallel-processor computers use a "shared-nothing" approach; that is, a collection of independent processors each having its own memory and disk are connected via a high-speed communication network. Copeland et al., "Data Placement in Bubba", ACM SIGMOD, Chicago, 1988; DeWitt et al., "A Performance Analysis of the Gamma Database Machine", ACM SIGMOD, Chicago, 1988; and DeWitt et al., "A Single-User Performance Evaluation of the Teradata Database Machine", Technical Report No. DB-081-87, MCC, Mar. 5, 1987. In such an architecture, communication and synchronization overhead are critical factors in overall query performance. Ghandeharizadeh et al., "A Multiuser Performance Analysis of Alternative Declustering Strategies", Proceedings of the Sixth International Conference on Data Engineering, Los Angeles, 1990. "Shared-nothing" computers are particularly well suited to evaluate queries that can be partitioned into independent subproblems, each of which can be executed in parallel with the others.

In contrast, in a "shared-everything" multiprocessor computer there are no communication delays and synchronization can be accomplished using high-performance, low-level techniques. Shared-memory multiprocessor architectures have been described in, for example, Sequent Computer et al., "Combining the Benefits of Relational Database Technology and Parallel Computing", Technical Seminar, San Francisco, Sep. 28, 1988. Computers of this kind are well adapted to evaluate queries that can be partitioned into temporally overlapping subproblems which can share the available computational resources. However, resource contention becomes a major source of performance degradation as many processors attempt to simultaneously access disks and share a limited pool of memory buffers. Stonebraker, "The Case for Shared Nothing", Database Engineering, 9(1), 1986.

There is a continuing need for a way to optimize query execution in a shared-everything computer so as to make the most effective use of the various resources of the computer. Six key issues in developing optimization techniques for multiprocessor computers are discussed in von Bultzingsloewen, "Optimizing SQL Queries for Parallel Execution", Database Query Optimization, Proceedings of the ODBF Workshop, Portland Oreg., 1989. The problem of allocating main memory buffers in uniprocessor query optimization has also been studied. Chou et al., "An Evaluation of Buffer Management Strategies for Relational Database Systems", Proceedings of the 11 th International Conference on Very Large Database Systems, 1985; Effelsberg et al., "Principles of Database Buffer Management", ACM TODS, 9(4), pages 560–595, 1984; Sacco et al., "Buffer Management in Relational Database Systems", ACM TODS, 11(4), pages 473–498, 1986. One approach to integrating buffer management with query optimization has been to apply traditional integer programming techniques with queueing analysis to analytically estimate the optimal execution strategy. Cornell et al., "Integration of buffer management and query optimization in relational database environment", *Proceedings of the Fifteenth International Conference on Very Large Data Bases*, Amsterdam, 1989.

Traditional query optimization proceeds in three stages. Jarke et al., "Query Optimization in Database Systems", ACM Computing Surveys, 16(2), pages 111–152, 1984; Elmasri et al., Fundamentals of Database Systems, Benjamin/Cummings, Redwood City, Calif. 1989. First, a query in a high-level language such as SQL is translated into an internal representation. This representation describes the equivalent relational algebraic operations to be performed along with any dependencies needed to restrict the overall order of execution. Second, the internal query representation is transformed using heuristic rules (based on theorems in the relational algebra) into an equivalent query that in most cases can be evaluated more efficiently. Third, an execution plan is generated by assigning computational algorithms to the relational operators. This is done by estimating the execution costs associated with each assignment of algorithms to operators and selecting the overall minimum cost assignment for execution. Most practical optimizers restrict the number of assignments that are considered in order to reduce the complexity of this step.

There are two major difficulties in using such traditional optimization techniques in a shared-everything, multiprocessor environment. First, the standard algorithms for computing relational operators are inherently sequential and cannot take advantage of the parallelism supported by the computer. And second, there is no straightforward way to assign processors and other computational resources to distinct subsets of the overall query computation.

Accordingly, it will be apparent that there remains a need for an efficient way to optimize queries in multiprocessor computer systems, especially "shared-everything" computer systems. Stated another way, there is a need for a way to control the allocation of resources in a parallel processor computer system when executing complicated tasks such as evaluating database queries.

SUMMARY OF THE INVENTION

The present invention provides a method of controlling the operation of a parallel processor computer system in executing a complex task such as evaluating a query of a database by efficiently allocating system resources to various subtasks that must be performed in order to execute the overall task.

Briefly and in general terms, the method includes the steps of calculating the minimum time that would be required to execute the task if the computer had infinite resources, scheduling each subtask against any resources needed to execute that subtask, determining how many resources would be required to meet the schedule, and executing the task if the computer has enough resources. If the computer does not have enough resources, a revised execution time is calculated, the schedule is adjusted in light of the revised execution time, and the number of resources needed to meet the adjusted schedule is determined. If the computer still does not have enough resources, the execution time is revised again and the process is repeated until a resource schedule that the computer can satisfy is found.

The process can be repeated as many times as desired. However, if two consecutive iterations result in a schedule requiring the same number of resources, it is preferable to assume that no further improvement can be obtained and to indicate that the adjusted schedule has yielded an optimal plan so the computer can proceed with execution of the task.

Preferably the minimum execution time is calculated by determining a critical path of substeps each of which depends on an output from the preceding one and all of which must therefore be executed sequentially rather than in parallel. Once this critical path has been determined, the minimum time to execute each such substep is determined on the assumption that there are enough resources to execute all portions of that substep simultaneously. Finally, these minimum substep times are summed to get the minimum execution time.

Calculating a revised execution time if the first schedule calls for more resources than are available preferably comprises forming a time scaling factor and using it to scale the execution time. This is done by figuring the ratio of the number of resources that are available to the number of resources that are required and using that ratio as the scaling factor. For example, if two resources are required but only one is available, the ratio of resources required to resources available is two, and the minimum time is thereupon multiplied by a factor of two to get the revised execution time.

If more than one kind of resources is to be allocated, an equivalence factor may be used to figure a ratio of required to available resources. The equivalence factor is determine by the particular characteristics of the available resources. How to determine such an equivalence factor is known in the art.

Other aspects and advantages of the present invention will become apparent from the following detailed description, taken in conjunction with the accompanying drawings, illustrating by way of example the principles of the invention.

DESCRIPTION OF THE PREFERRED EMBODIMENT

Figure 1:
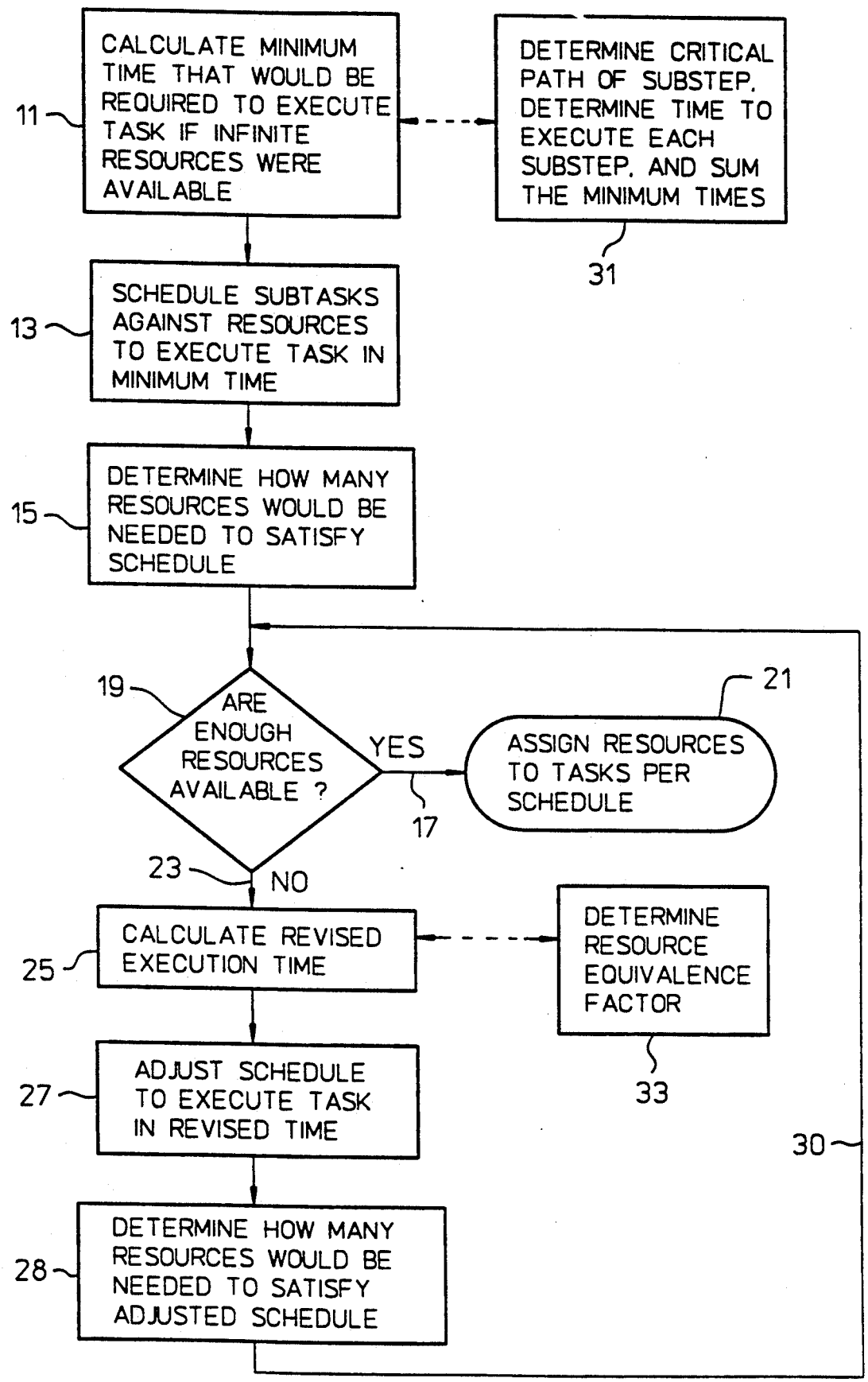
FIG. 1 is a flowchart depicting a preferred embodiment of the invention.

As shown in the drawings for purposes of illustration, the invention is embodied in a method of controlling the allocation of resources of a parallel processor computer system in executing a complicated task such as evaluating a database query. Various methods have been proposed for resolving conflicting demands for resources such as processors and memory buffers, but these have not been adequate.

In accordance with the invention, a minimum time to execute the task assuming infinite resources is calculated, a schedule of subtasks against resources is made, how many resources would be required to meet the schedule is determined, and the schedule is carried out if the computer has enough resources. If the computer does not have enough resources, the execution time is revised and the process repeated.

The invention provides a method of controlling the operation of a computer system in executing a task, the computer system being of the kind that has a plurality of simultaneously operable resources, the task being of the kind that has a plurality of subtasks more than one of which could be executed simultaneously given enough resources. The method of the invention is depicted in flowchart form in FIG. 1. The method comprises:

(a) calculating a minimum execution time that would be required to execute the task assuming the computer system has enough resources to simultaneously perform all the subtasks that could be performed simultaneously, as in a block 11;

(b) scheduling each subtask against any resources required to execute that subtask such that adherence to the schedule would result in executing the task in the minimum execution time, as in a block 13;

(c) determining how many resources would be required to satisfy the schedule, as in a block 15;

(d) determining whether the computer system has the requisite number of resources available, as in a decision block 19;

(e) if the computer system has enough resources available, as indicated by an affirmative output 17 from the decision block 19, causing the computer to assign its resources to the subtasks according to the schedule as in a block 21; and if the computer system does not have the requisite number of resources, as in a negative output 23 from the decision block 19, (1) calculating a revised execution time, as in a block 25, (2) adjusting the schedule of subtasks against resources such that adherence to the adjusted schedule would result in executing the task in the revised execution time, as in a block 27, (3) determining how many resources would be required to satisfy the adjusted schedule, as in a block 28, and (4) looping back to step (d) as in a loop line 30 from the block 28 back to the decision block 19 to perform steps (d) and (e) again.

Preferably, calculating the minimum execution time as in the block 11 comprises determining a critical path of substeps which must be executed sequentially, determining the minimum time to execute each such substep if there were enough resources to execute all portions of that substep simultaneously, and summing the minimum times to get the minimum execution time, as indicated by a block 31.

Figures 1A, 1B:
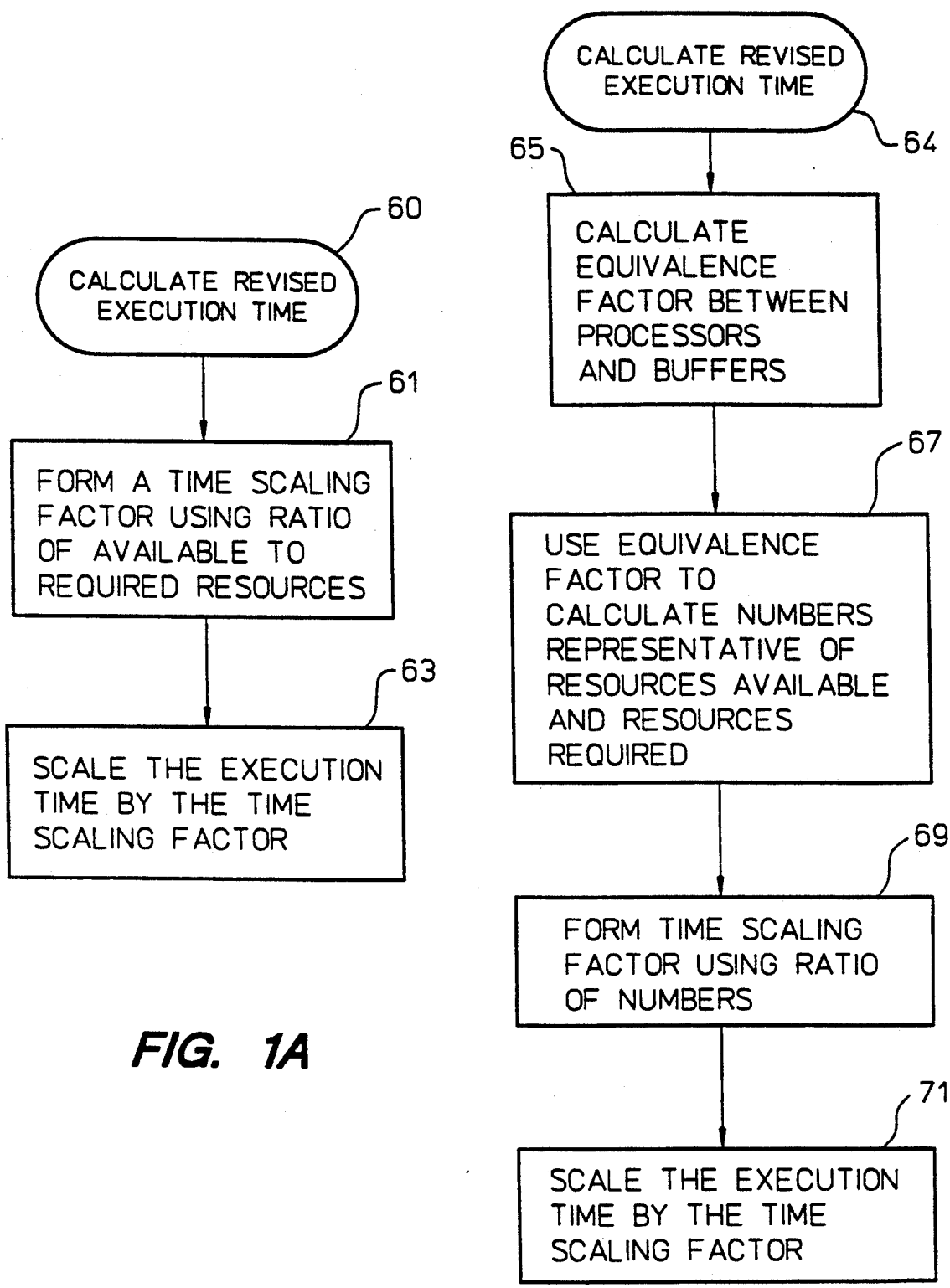
FIG. 1A is a flowchart depicting in more detail block 25 of FIG. 1.
FIG. 1B is a flowchart illustrating another embodiment of block 25 of FIG. 1.

Calculating a revised execution time as in the block 25 preferably comprises forming a time scaling factor by taking the ratio of the number of resources that are available and the number of resources that are required as in a block 61 in FIG. 1A, and scaling the execution time by the scaling factor to obtain the revised execution time as in a block 63. The beginning of this procedure is indicated generally by a procedure begin block 60. More particularly, this may include determining an equivalence factor between various kinds of resources as generally indicated by a block 33 in FIG. 1, for example an equivalence factor between processors and buffers as indicated in a block 65 in FIG. 1B, using the equivalence factor to calculate a first number representative of the numbers of processors and buffers that are available and a second number representative of the requisite numbers of processors and buffers as in a block 67, forming a time scaling factor by taking the ratio of the first and second numbers as in a block 69, and scaling the execution time by the scaling factor to obtain the revised execution time as in a block 71; the beginning of this procedure is indicated generally by a procedure begin block 64.

Figure 2:
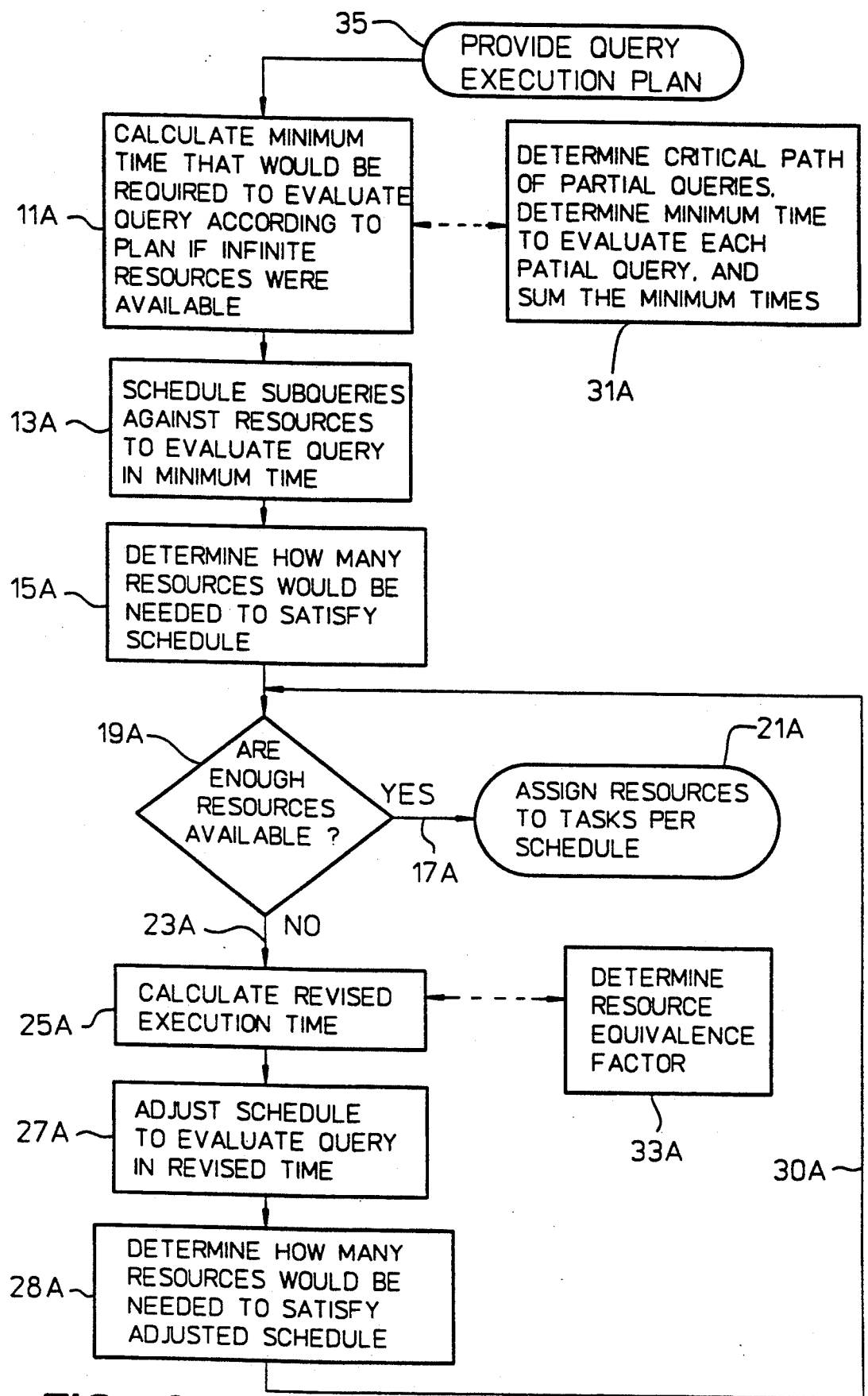
FIG. 2 is a flowchart depicting an embodiment of the invention similar to that shown in FIG. 1 and a particularly adapted to evaluating a query of a database.

In a preferred embodiment, the method of the invention is used to allocate resources in evaluating a query of a database system, as depicted in flowchart form in FIG. 2. Most of the blocks in FIG. 2 are similar to the blocks in FIG. 1; such blocks have been assigned the same reference numerals as the corresponding blocks in FIG. 1 with the suffix "A" and will not be further discussed. Evaluation of a database query usually begins with a query evaluation plan, as indicated by a starting block 35. Procedures for preparing such evaluation plans are known in the art and will not be discussed further herein.

The loop as indicated in FIGS. 1 and 2 by the loop lines 30 and 30A, respectively, may be repeated as often as desired until finding a schedule in which the number of resources does not exceed the number of resources that are available. However, once two consecutive iterations of the loop result in schedules having the same number of resources, it is usually desirable to end the procedure. An embodiment of the invention in which this is done is shown in flowchart form in FIG. 3.

Figure 3A:
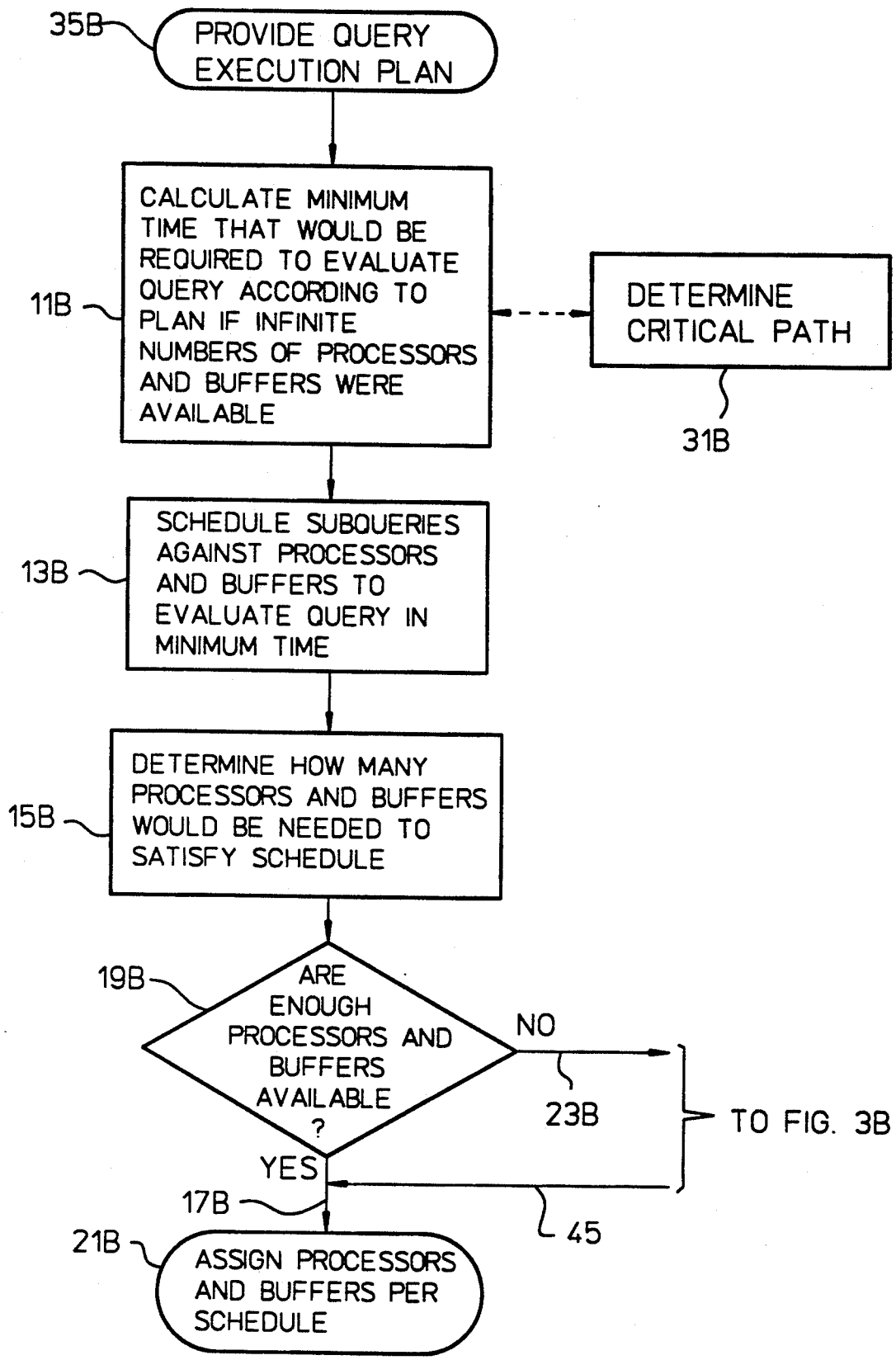
FIGS. 3A and 3B are flowcharts of an embodiment similar to that shown in FIG. 2 and including the feature of stopping iterations if the number of required resources does not change in two consecutive iterations.
Figure 3B:
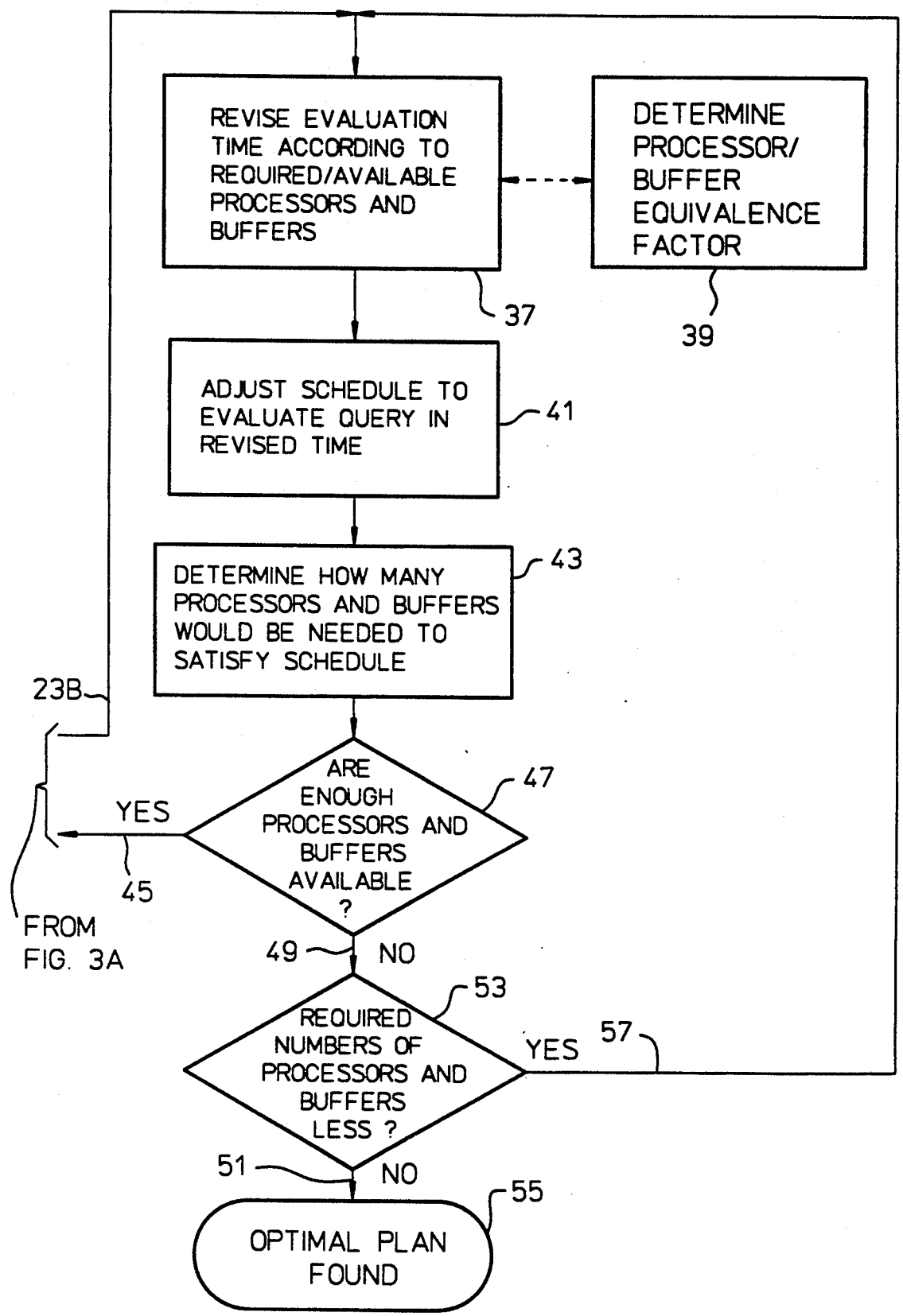

The first portion of the method as depicted in FIG. 3, up through a first decision block 19B, is similar to the first portion of the method as depicted in FIG. 2. However, the loop structure of the method as shown in FIG. 3 is somewhat different from that shown in FIG. 2, and for clarity all blocks after the first decision block 19B have been assigned new reference numerals and will be discussed individually hereafter even though it will be apparent that some of these blocks are similar to blocks in FIGS. 1 and 2. Those blocks of FIG. 3 that correspond with blocks of FIG. 2 up through the first decision block 19B are identified by the same reference numerals as the corresponding blocks of FIG. 2 but with the suffix "B", and these blocks will not be discussed further.

If the computer system does not have the requisite number of processors and buffers, as in the negative output 23B from the decision block 19B, a revised evaluation time is calculated as in a block 37, a processor/buffer equivalence factor is computed if necessary as in a block 39, the schedule is adjusted as in a block 41, how many resources would be required to satisfy the adjusted schedule is determined as in a block 43, and if the computer system has the requisite number of processors and buffers available as in an affirmative output 45 from a decision block 47, the resources are assigned to the subqueries according to the schedule as in the block 21B.

If the computer system does not have the requisite number of resources, as in a negative output 49 from the block 47, and if the requisite number of processors and buffers is not less than the previously-calculated requisite number as in a negative output 51 from a decision block 53, the computer is instructed to evaluate the query, as in an ending block 55. If the requisite number of processors and buffers is less than the previously-calculated requisite number, the procedure repeats as indicated by an affirmative output 57 from the block 53 which loops back to the block 39.

Figure 4:
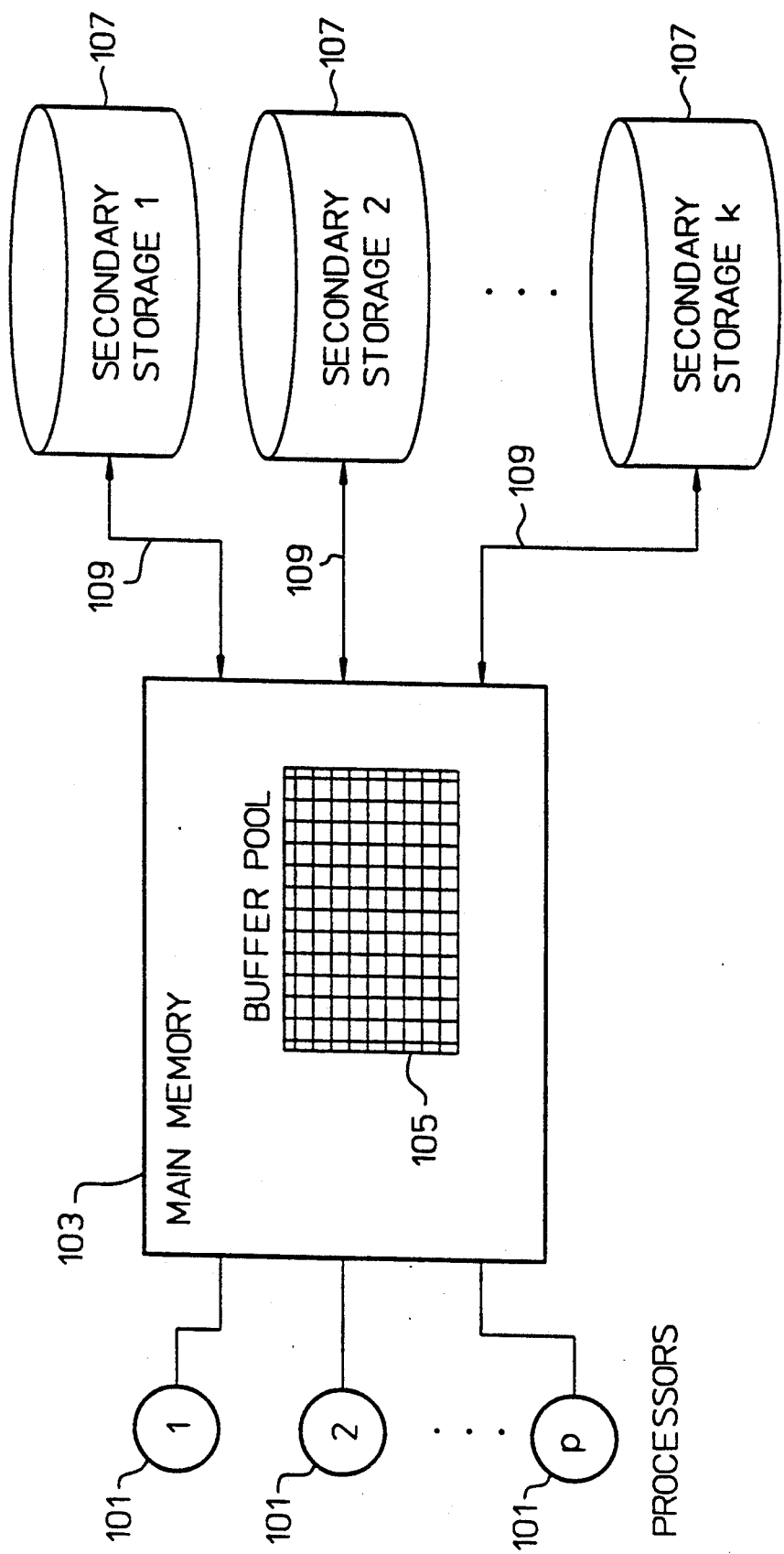
FIG. 4 is a block diagram of a "shared-everything" multiprocessor computer system of the kind in which the method of the invention is practiced.

The invention finds a primary application in optimizing query execution in a multiprocessor computer system generally similar to the one shown in FIG. 4. A plurality of processors 101 are in communication with a main memory 103 which includes a buffer pool 105. A plurality of secondary storage units 107 (magnetic disk drives or the like) are also in communication with the memory 103. Computers of this general kind are known in the art; see, for example, Osterhaug, *Guide to Parallel Programming on Sequent Computer Systems*, 1989.

Each of the processors 101 executes instructions independently of the other processors and can be individually scheduled. Data are stored and transferred in fixed-size units; these units are sometimes referred to as "blocks" in secondary storage, as "buffers" in main memory, or simply as "pages" of data. The term "buffer" is preferably used to refer to a section of memory in which a page or other quantity of data are stored. Once a page of data is in a buffer in main memory, that data is accessible by any number of processors simultaneously.

Data are transferred between a secondary storage unit 107 and the memory 103 through an input/output ("I/O") channel (not shown) which has a bounded concurrency (that is, a maximum number of operations that can be taking place at any one time). Typically some or all of the secondary storage units share a single I/O channel.

The computer has a low-level hardware synchronization mechanism (not shown) to coordinate parallel accesses to individual memory locations and to insure processor cache consistency. The computer also has a high-level concurrency control mechanism to serialize concurrent transaction disk page read and write operations. However, the effects of these mechanisms will be ignored in the following discussion because the method of the invention requires access only to pages in memory buffers and not to individual addressable memory cells, and because multiple conflicting transactions are not modeled.

The multiprocessor computer system is formally described by the following five parameters:
D degree of concurrency,
$T_r$ time to transfer one block of data,
M maximum number of memory buffers,
p maximum number of processors, and
T time to perform one page operation.

The degree of concurrency D is the number of I/O paths 109 that can simultaneously transfer data to and from the secondary storage units 107. Each I/O path is associated with one such unit. In the embodiment of the invention as described herein, each secondary storage unit has its own controller rather than a closely-coupled multi-disk I/O subsystem.

The time $T_r$ to transfer a block of data is a system-defined constant. The maximum number M of memory buffers and the maximum number p of processors are fixed in advance. The time T to perform a page operation is a system constant with a value that depends on the operation being performed (for example, $T_j$ is the time to perform a page-join and $T_s$ is the time to do a page search). It is assumed that the time $T_r$ to transfer a block of data is longer than any of the page operation times. About 2,000 to 8,000 instructions can be executed during the time of a single disk I/O operation.

The multiprocessor system hardware allows parallel access across all D disks in the system, suggesting an effective I/O subsystem bandwidth that is a factor of D greater than that of a single disk. In order to realize this concurrency, however, the data accessed by the application must be stored on the disks in such a way that all disks can be simultaneously transferring data to or from memory buffers. This requires a close coupling between the data storage techniques, the processing algorithms, and the main memory buffer management routines. The following paragraphs describe a strategy for storing data on multiple disks in order to maximize the effective I/O subsystem bandwidth. Associated processing algorithms and buffer management routines will be discussed in more detail presently.

MULTI-DISK ACCESS METHODS

(a) Initial Comments

For simplicity, we assume that data is partitioned rather than partially or fully replicated. This eliminates any need to synchronize updates, as well as reducing the number of processing strategies to be considered during query optimization. We also assume, again for simplicity, that each relation is equally partitioned across some subset of the disks. A centralized data dictionary records the location of each relation fragment and the fragment size for reference during query optimization and execution.

Storage structures are used on each disk to provide efficient access to the subset of data resident on that disk. We assume each fragment of a relation has the same type of storage structure. These storage structures are manipulated by access methods supporting a standard data access interface (open, ordered-scan, random-search, insert, delete, close). In addition, we assume the existance of multi-disk access methods which span multiple volumes. These structures are variations of the standard single-disk structures and support concurrent implementations of the ordered-scan and random-search operations. The access methods described below are representative samples of this type of structure rather than a comprehensive collection.

In order to fully support concurrent access, the individual data records must be randomly partitioned across the disks (i.e. declustered) rather than distributed based on some attribute value. If data is partitioned by value, access on a single value cannot be performed in parallel, since all of the records containing that value will reside on a single disk. This restricts ordered scans to be sequential accesses. Although multiple random searches could be performed in parallel (over distinct values), this requires a significantly more complex control structure for the associated processing algorithms. Note that regardless of how the data is partitioned among the disks, within each disk it may or may not be clustered depending upon the particular single-disk storage structure used.

(b) Dense Spanning B-Tree (SB-Tree)

The dense spanning B-tree (SB-tree) is a variation on a B+-tree which provides concurrent access to data spanning multiple disks. Fragments on each disk are organized into local B+-trees. In addition, there is a single SB-tree structure (residing on a single disk) containing one entry per record. Each record entry consists of a set of <attribute, disk number, TID> values.

Ordered-scan operations are performed by reading from all of the disks in parallel (using the local B+-tree to read in sequential order), then merging the values from all disks to produce the final sorted result. This scheme requires a truely random partition of the records across the disks in order to allow processing of records from each disk at approximately the rate they are being read in. Non-random partitions will require more memory buffers in order to hold records until they can be placed in the final ordered result.

Random-search is performed by first searching the global SB-tree to determine the disks and TID's of all qualifying records, then directly accessing all relevant disks in parallel. Note that the data will be clustered by value on each disk, allowing all records on each disk block to be processed at the time the block is read into memory.

When a new record is inserted into the file, the disk with the fewest number of records is selected and the record inserted into the local B+-tree. Once this has been done, the record's TID is known, and an entry can be made in the global SB-tree. Records are deleted by first searching the SB-tree to obtain the associated disk number, then removing the record entries from both the SB-tree and the local B+-tree.

(c) Primary Spanning Hash

A primary spanning hash structure requires no auxiliary structure other than an entry in the data dictionary. Data is partitioned among the disks, and each disk has a local hash table built using identical hash functions. Ordered-scan is not supported. Random search is performed by hashing the search key, then reading all of the associated hash buckets into memory in parallel and searching them for any qualifying records. Note that this structure supports datasets with a large number of duplicate search key values (compared to single disk structures), providing the records are randomly distributed across the disks. When a new record is inserted into the structure, it is inserted into the hash table on the disk with the fewest number of records. Records are deleted by searching the hash tables on all of the disks and removing the record when it is found.

(d) Secondary Spanning Hash

A secondary spanning hash structure is a global data structure (residing on a single disk) based upon a collection of local fragments. The global hash table contains entries consisting of <attribute, disk number, TID> values. Ordered scan is not supported. Random search is implemented by searching the global structure to determine the disk numbers and TID's of qualifying records, then accessing all of the qualifying disks in parallel. On record insertion, the record is added to the disk with the fewest number of records and an entry is placed in the global hash table. On record delete, the global table is used to identify the disk on which the record is located, then both the record and the global hash table entry are removed.

(e) Join Index SB-Tree

SB-Trees can be used to construct a type of join index in a straightforward manner. See, generally, Goyal et al., "Scheduling of Page Fetches in Join Operations using Bc-Trees", Proceedings of the Fourth International Conference on Data Engineering, Los Angeles, 1988; Valduriez, "Join Indices", ACM TODS, 12(2), pages 218–246, 1987.

Records from the two join relations are partitioned among the disks and stored in local structures. The two relations need not have the same type of local structure, nor do they need to be organized on the join attribute. A global SB-tree contains entries from both relations. The entry format is extended to include the relation ID as well as the other information: <attribute, disk number, TID, relation ID>. Whenever a record is inserted into one of the relations, a corresponding entry is made in the join index. The leaf level entries of the SB-tree will contain matching join attribute values in adjacent record slots, along with the associated disks and TID's. The join result is materialized by retrieving the records for all matching join attribute values. Disk bandwidth utilization can be optimized by processing all records on each disk block at the time it is first read into memory, rather than rereading the data block for each qualifying record.

PARALLEL EXECUTION STRATEGY

The following paragraphs describe parallel versions of standard methods of executing relational operators. These parallel versions provide feasible strategies that actually support concurrent execution in order to illustrate the optimization framework of the invention. This framework is sufficiently general to support any algorithms with parallel resource requirements that can be estimated with reasonable accuracy.

(a) Select

The select operator has a single relation arguement and a result consisting of all tuples in the relation which satisfy some select criteria. We consider three basic algorithms for evaluating a select operator. First, if no index support is available, all of the tuples must be examined to determine whether or not the search criteria are satisfied. This is done by reading in parallel from all disks, then scanning the pages and evaluating the search criteria tuple by tuple. The read and scan operations are overlapped so that pages are scanned as soon as they are read into memory buffers. Second, if multi-disk access method support is available, the select is implemented by invoking the concurrent random-search access method entry point and accumulating the result tuples for further processing. Third, if the tuples being selected are the result of executing another relational operator, they can be filtered by applying the search criteria to each tuple in turn without performing any additional disk I/O.

(b) Project

The project operator takes a single relation as an arguement and produces a collection of tuples with a subset of the attributes in the original relation. In all of the execution strategies considered by our optimization strategy, the project operation immediately follows a select operation (possibly with a "true" predicate). Hence we only consider a single algorithm for parallel project execution and assume that the input tuples are always a memory resident stream. The tuples are filtered, block by block, by removing any superfluous attributes without performing any additional disk I/O.

(c) Build Storage Structure

In addition to the storage structures determined during physical database design and permanently maintained by the DBS, temporary structures may be created during query execution and then discarded as soon as execution is complete. We assume the existance of algorithms for sorting a relation into a collection of ordered disk fragments and hashing a relation into a collection of local hash tables.

Page connectivity graphs (PCG) can be constructed from SB-trees, secondary spanning hash structures and SB-tree join indices. In all cases, the index entries are scanned to produce a dense PCG (i.e. containing one node for each tuple appearing in the result and one edge for each pair of tuples with a matching join attribute values), which is then reduced into a page connectivity graph (containing one node for each disk block with at least one tuple appearing in the result, and one edge for each pair of disk blocks with at least one matching join attribute value in common).

(d) Join

The join operator takes two relations as arguements, and produces a result equal to the subset of the tuples in the cartesian product of the two relations satisfying the join criteria. We consider parallel versions of the three standard join algorithms (hash, merge, nested loops join) as well as a new algorithm specifically designed for shared memory multiprocessor environments (PCG join). All of the algorithms are executed in conjunction with select-project filters over the input tuple streams.

(d)(1) Hash Join

The hash join assumes that both relations are hashed on the join attribute using identical hash functions. This partitions the tuples into buckets by join attribute value. Each bucket may contain several join attribute values, however all tuples with the same join attribute value are stored in corresponding buckets. In a multi-disk environment, the data is organized into a primary spanning hash structure. Alternatively, one or both of the relations can be hashed into a temporary spanning hash structure as needed for the duration of join processing.

The join itself is processed by reading corresponding buckets into memory, disk block by disk block. Since the data is partitioned randomly across the disks, each disk containing a relation fragment will contain a hash bucket corresponding to each pseudokey value. All buckets with the same pseudokey value are read at the same time. As soon as at least one disk block from each relation is memory resident, tuples can be compared pairwise to determine whether or not they appear in the join result. This matching operation over pairs of disk blocks is called a page join. Every pair of disk blocks from corresponding hash buckets must be page joined in order to compute the overall join result.

By processing the page joins bucket by bucket, memory buffer requirements are minimized. If there are insufficient memory buffers to contain the largest hash bucket and one disk block from the other relation, some data blocks will need to be reread during join processing. The number of processors allocated to join processing should be the number required to complete page join processing over a single bucket during the time required to read that bucket into memory.

(d)(2) Merge Join

The merge join assumes that both relations are ordered on the join attribute value. This ordering groups the tuples by ascending (descending) join attribute value. In a multi-disk environment, the data is either stored in an SB-tree structure, or a temporary spanning ordered structure is constructed for the duration of join processing (by sorting the fragments resident on each disk into a temporary structure).

The join is executed by performing multi-disk ordered scans of the two relations and performing a multi-way merge-join among all of the input disk block streams. It is possible to implement an efficient multiprocessor multi-way merge strategy, as generally discussed in Salzberg et al., "FastSort: A Distributed Single-Input Single-Output External Sort", Proceedings of the 1990 ACM SIGMOD International Conference on Management of Data, Atlantic City, N.J., 1990. However, for present purposes only the simpler case in which merging is done on a single processor will be described.

If the data sets contain a small number of duplicate join attribute values and if the data is randomly distributed among the disks, then only one or two memory buffers per relation fragment are needed. If there are large numbers of duplicate join values, then multiple disk blocks may need to be buffered until all of the pairwise tuple matchings have been identified. If the data is not randomly distributed among the disks, then data will not be processed at the same rate within each fragment. This will either require additional buffers to hold blocks from fragments that are "running behind" the others or a mechanism to delay reading the next block from disk.

(d)(3) Nested Loops Join

The nested loops join algorithm assumes a multi-disk structure supporting random-search exists on one of the two relations. The structure may or may not cluster tuples by join attribute value, and it may or may not provide efficient access. For example, a primary spanning hash structure clusters tuples by join attribute value and provides efficient access. A secondary spanning hash structure need not cluster tuples by join attribute value, however it does provide relatively efficient access. An unordered partitioned access method does not cluster the tuples nor does it provide efficient access, however it does provide an implementation of random-search by scanning the entire relation and hence could be used in nested loops join processing.

The join is processed by scanning one relation (the "outer" relation). For each tuple in the outer relation, the other relation (the "inner") is random-searched to retrieve any tuples with matching join attribute values. The random-search is done in parallel across all of the disks, using the search algorithms described above. There are several variations of this algorithm which differ in how the outer relation is scanned. First, the outer relation can be processed sequentially tuple by tuple. Second, all of the tuples in a single block of the outer can be processed in parallel. Third, k pages of the outer can be read in parallel, and the tuples on each page processed sequentially. Fourth, k pages of the outer can be read in parallel, and all of the tuples on each page can be processed in parallel. In general, a search operation will require multiple disk I/O, so it will not be possible to effectively overlap reading the outer relation with searching the inner relation (unless the two relations are stored on disjoint subsets of the disks).

The algorithm requires one memory buffer per active page from the outer relation and at least one memory buffer per disk for each of the parallel search operations.

(d)(4) Page Connectivity Graph Join

The page connectivity graph join assumes the existence of a page connectivity graph ("PCG"). For background on the page connectivity graph join, see Murphy et al., "Processor Scheduling for Multiprocessor Joins", *Fifth International Conference on Data Engineering*, Los Angeles, 1989, and Murphy et al., "Effective Resource Utilization for Multiprocessor Join Execution", Ver Large Data Bases, Amsterdam, 1989. This structure describes which pairs of disk blocks from the two relations contain at least one matching join attribute value. Algorithms for constructing page connectivity graphs from multi-disk indices are described above.

Joins are processed by scheduling parallel page reads from the two relations in such a way that all pages containing matching join attribute values are in memory at the same time (insofar as possible). Additionally, the algorithm attempts to avoid reading pages into memory more than once during join processing. This goal can only be achieved if sufficient memory buffers are available. The static version of the algorithm produces page read schedules for each disk containing a relation fragment and page join schedules for each participating processor. Each device has a schedule of events to process, along with a list of precedence constraints indicating which other events must complete before each event on the schedule can be initiated. The dynamic version of the algorithm is similar, except the scheduling decisions are made during run time using actual execution times rather than expected execution times.

The preceeding two sections describe a multiprocessor based execution environment and a collection of algorithms for parallel execution of simple relational operators (select, project, join). In the next two sections we describe how complex queries are processed in parallel.

Limitations to Pipelining Between Parallel Operators

In a traditional query execution environment, the collection of relational operators making up the query are themselves executed sequentially. Intermediate result generation is avoided (where possible) by the use of pipelining, in which the result tuples of one relational operator are immediately processed as the input tuples of the next relational operator. This requires concurrent execution of the relational operators (i.e. the first operator in sequence executes and produces tuples, as the succeeding operator is actively executing using the tuples already produced as input). In a uniprocessor system this is only logical concurrency-in actuality the various operators are interleaved and executed sequentially on the one underlying processor. In a multiprocessor environment, each operator in the pipeline can be assigned to a disjoint collection of processors for true parallel execution.

Many of the standard algorithms for the relational operators can be executed in "filter mode" as part of a pipeline. Under this mode of execution, the algorithms process one or more input streams of tuples one by one (buffering may be used to reduce communication cost) and produce an output stream of tuples as the input is processed. There are some standard operators, however, which are inherently sequential. For example, a "sort" operation cannot produce the first tuple until all of its input tuples have been processed. We call this type of relational operator a "synch point" in the overall query execution. Suynch points terminate sequences of pipelined operations. The result of executing a synch point operation is a temporary relation. (Although some results may be sufficiently small to be stored in main memory, it is difficult to predict result sizes accurately enough to guarantee that the result will not be too big, so we assume a temporary relation is always created.)

Another difficulty arises with a "random-search" operation over the unordered result of a subquery. Although a partial result can be computed as the subquery result is being generated, the complete search result cannot be obtained until all of the tuples in the subquery result have been produced. A similar problem arises when an identical subquery must be executed many times. In this case the tuples could be processed in pipelined fashion, however repetitive calculation of the subquery is probably less efficient than creation of a temporary result relation prior to sending the first tuples "up the pipe". For example, if a nested loops join appears in the inner loop of another nested loops join, the inner relation of the inner join must be searched once for each iteration. In the absence of any supporting storage structure, it is probably more efficient to compute the inner join and store the result in a temporary relation prior to executing the second join. We call this kind of node a "semi-synch point". Although in some cases the tuples could be passed through during the initial temporary generation phase, for simplicity in formulating the cost equations, we treat this kind of node as a true synch point as defined above.

PARALLEL SUBQUERY EXECUTION

Query execution plans specify a partial ordering on the relational operators making up the query. We call each piplined sequence of adjacent operators terminated by a synch point a subquery. Two subqueries can execute in parallel without coordination if they are unordered with respect to each other (i.e. there is no node in one subquery which is an ancestor or descendent of a node in the other subquery). If the two subqueries reference data stored on different disks, then the subqueries are disjoint and can be executed in parallel without interfering with each other. If two or more subqueries need to access the same disk, the total disk bandwidth is shared among them. This will not affect the logical separation of subqueries, however it will influence the amount of execution time required for each subquery.

Regardless of whether or not subqueries share disks, each subquery will have a duration that has a minimum value determined by how quickly the data can be read into memory buffers and processed. The actual execution time may be longer than this minimum if the subquery is allocated insufficient disk bandwidth, memory buffers or processors. In general each subquery preceeding the synch point will complete processing at a different time. However, since the synch point cannot produce any output until all of its input tuples are available, the overall execution time for the synch point query will be determined by the slowest of the subqueries on which it depends.

This suggests a strategy for allocating resources to subqueries in order to minimize execution time as well as maximize resource utilization: determine the longest sequence of subqueries in the execution plan (the critical path) and allocate sufficient resources so that these subqueries can complete processing in minimum time; then allocate resources to the remaining subqueries so that all inputs to the same subquery complete processing at approximately the same time (i.e. balance the input subqueries). If the sum total of all resources allocated under this strategy is greater than the amount available, the overall query execution time can be increased and all of the subquery resource allocations rebalanced relative to this new time. Eventually this process will produce an execution plan which completes in minimum time using only the available resources, or an indication that no such plan exists.

In order to implement execution plan balancing in a practical algorithm, we need to be able to compute how long each subquery will take to execute as well as the actual computational resource requirements. Our approach to this problem is to first estimate the effects of disk bandwidth contention, then to estimate the minimum execution time using an unbounded number of processors and buffers, and finally to estimate the actual resource requirements given a target execution time for each subquery. The following section describes the overall optimization technique as well as our cost estimation and resource allocation strategies.

STARBURST-STYLE OPTIMIZER CUSTOMIZATION

Three components are needed to customize a Starburst-style query optimizer: a collection of expansion rules, a collection of cost functions, and an expansion strategy. See, generally, Lohman, "Grammar-like Functional Rules for Representing Query Optimization Alternatives", ACM SIGMOD, Chicago 1988; Lee et al., "Implementing an Intepreter for Functional Rules in a Query Optimizer", Fourteenth International Conference on Very Large Data Bases, Los Angeles, 1988; and Tran, Knowledge-Based Query Optimization, 1990.

The expansion rules define all of the query execution plans considered by the optimizer. The rules are either specific or generic: specific rules (LOLYPOPS and GLUE) identify execution algorithms used during query processing; generic rules (STARS) define relational algebraic expressions in terms of a set of equivalent expressions (described in terms of STARS, LOLYPOPS and GLUE). Cost functions are defined for LOLYPOPS and GLUE and are used to estimate the resource requirements required during execution of the associated algorithm. During query optimization, the "root star" expression for the query is expanded using the generic rules to iteratively substitute for STARS until the execution plan is fully specified in terms of LOLYPOPS and GLUE. Each query will typically have many possible expansions. The optimizer will attempt to generate the lowest cost query expansion, however many different partial expansions may be considered and retained during the optimization process itself. The expansion strategy determines the order in which STAR substitution is performed, how many expansions are considered and which partial expansions are retained for further consideration. Note that subquery cost evaluation cannot be performed unless the subquery is fully expanded, limiting the feasible expansion strategies to variations on depth-first traversal.

(a) Expansion Rules (STARS, GLUE and LOLYPOPS)

This section presents a representative collection of query expansion rules. For explanatory purposes, we limit queries to have at most four joins and to be of the form: A join B join C join D join E (where each of the joins is over a different attribute). All queries are initially described as a "root-star" of the form:

filter (join4 (filter(A),filter(B),filter(C),filter(D),filter(E),P1join, P2join,P3join,P4join)

In the rules listed below, the numbered line contains a STAR statement, and the succeeding lines the collection of equivalent expressions. The following notation is used: A,B,C,D,E,R are relations, Pnjoin is the join predicate for the nth join (relative to the sequence given in the STAR statement), LOLYPOPS are underlined in expressions, Prestrictor is a relational select predicate, and {C} the set of attributes appearing in a relational project operation. Notes and conditions of applicability are enclosed in square brackets.

The first three rules describe all of the possible ways to decompose a query into a partially ordered collection of 2-way joins. The fourth rule describes application of the four join algorithms (LOLYPOPS) considered for 2-way join processing. The fifth rule describes the combined relational select and project operations in terms of a single processing step over a collection of tuples (as described above). The sixth rule lists the various GLUE algorithms considered.

Query Expansion Rules:

1. Join4 (A,B,C,D,E,P1join,P2join,P3join,P4join) =
    join (A,join3(B,C,D,E,P2join,P34join,P4join),P1join)
    join (join (A,B,P1join),join2(C,D,E,P3join,P4join),P2join)
    join (join2(A,B,C,P1join,P2join),join (D,E,P4join),P3join)
    join (join3(A,B,C,D,P1join,P2join,P3join,D,P4join)
2. join3 (A,B,C,D,P1join,P2join,P3join) =
    join (A,join2(B,C,D,P2join,P3join),P1join)
    join (A,B,P1join),join(C,D,P3join),P2join)
    join (join2(A,B,C,P1join,P2join),D,P3join)
3. join2 (A,B,C,P1join,P2join) =
    join(A,join(B,C,P2join),P1join)
    join (join (A,B,P1join),C,P2join)
4. join (A,B,Pjoin) =
    hash-join (hash(A),hash(B),Pjoin)
    merge-join (sort(A),sort(B),Pjoin)
    nested-loops (A,build_index(B),Pjoin)
    nested-loops (B,build_index(A),Pjoin)
    PCG-join (build_pcg(A,B),Pjoin)
5. filter (R,Prestrictor,{C}) =
    [Prestrictor=initial where-clause predicated over R alone]
    [{C} =result+join attributes]
    scan(R,Prestrictor,{C})
    R on disk,result stream structured as R]
    index-search (R,Prestrictor,{C})
    [R has index on P atribute, results an unordered stream]
    stream-search (R,Prestrictor,{C})
    [R a stream, result a stream ordered as R]
6. Glue Lolypops, all default to NOP if the indicated structure already exists:
    hash(R,attr)
    sort(R,attr)
    build index(R,attr)
    build pcg(R,attr)

(a)(1) Example

The following example illustrates the application of these rules during query optimization. The rules collectively define all of the possible execution plans for the query. The expansion strategy determines which of these plans are considered during query optimization. In this section we describe the complete expansion, in the following sections we describe how the number of plans actually generated is limited by selective pruning of subqueries as well as through the use of heuristics.

The initial SQL query contains four joins (of the restricted form defined above), as well as a representative collection of relational select and project operations over each of the participating relations:

SQL:
    select A.a1, B.b1, C.c2, D.d1, E.e1
    from A,B,C,E
    where A.a2=cons1 and
        B.b2=cons2 and
        C.c2=cons3 and
        D.d2=cons4 and
        E.e2=cons5 and
        A.a3=B.b3 and
        B.b4=C.c3 and
        C.c4=D.d3 and
        D.d4=E.e3

The SQL query is parsed and translated into an internal representation in terms of the root-star format. For the simple SPJ queries considered in this paper, the translation from SQL into the root-star format is a simple syntactic mapping.

-continued

Query Expansion Rules:

Root-Star Format:
filter (join4(filter(A,A.a2=cons1,{a1,a2,a3}),
    filter (B,B.b2=cons2,{b1,b2,b3,b4}),
    filter (C,C.c2=cons3,{c1,c2,c3,c4}),
    filter (D,D.d2=cons4,{d1,d2,d3,d4}),
    filter (E,E.e2=cons5,{e1,e2,e3}),
      A.a3=B.b3,B.b4=C.c3, C.c4=D.d3,D.d4=E.e3),
  true,{a1,b1,c1,d1,e1})

Figure 5:
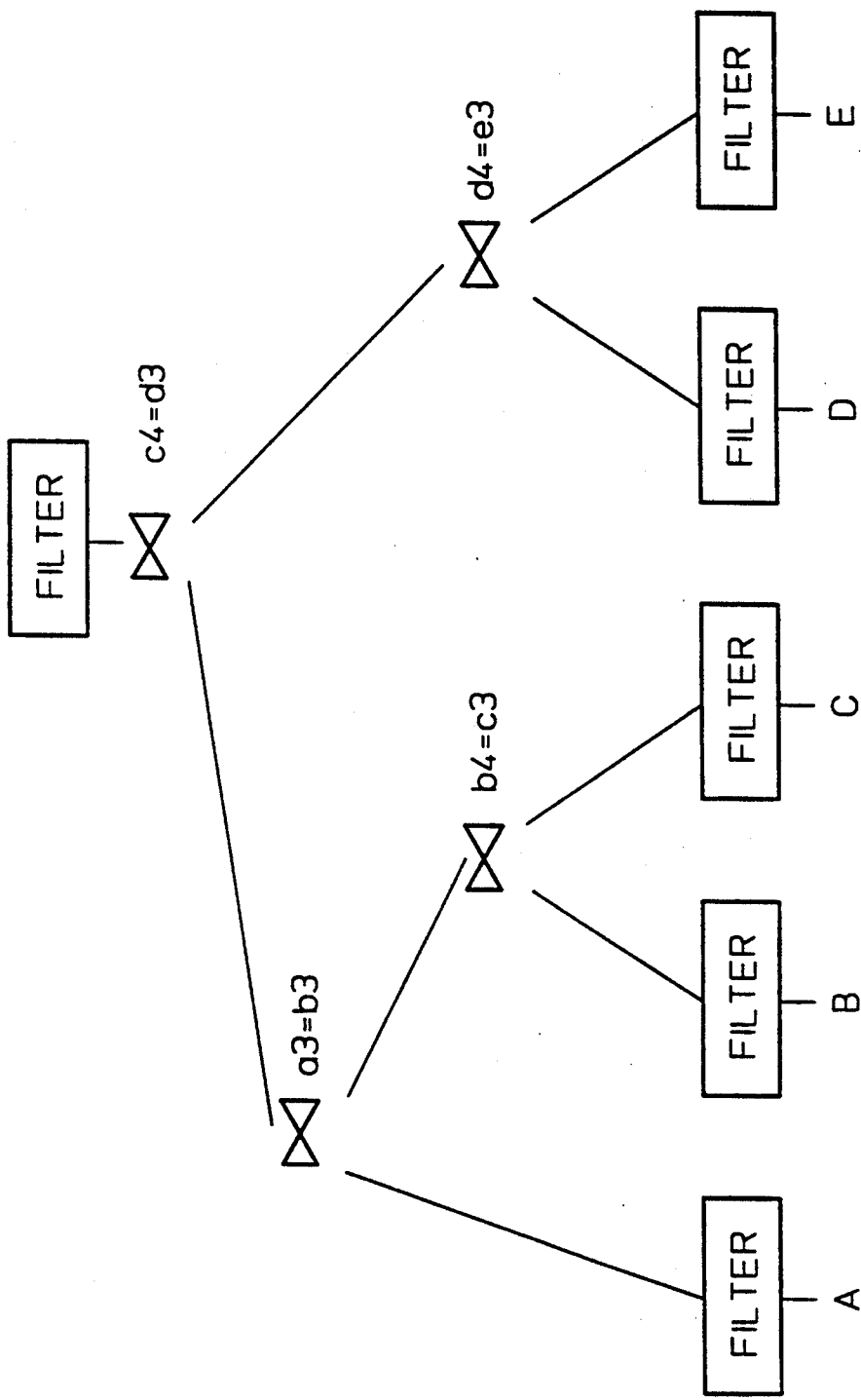
FIG. 5 is a diagrammatic representation in tree structure form of an SQL query of the kind to be optimized according to the method of the invention.

Once the root-star format has been identified, the optimizer uses STARS 1–3 in order to expand out the join4 STAR into a partially ordered collection of 2-way joins. FIG. 5 illustrates one such expansion. In a textual STAR expansion the partial order is described using nesting parentheses, with inner nested parenthesized expressions preceding any expressions in which they are enclosed. In FIGS. 5 through 10 an equivalent tree structure is used with the convention that every node follows all subtrees rooted at that node.

Figure 6:
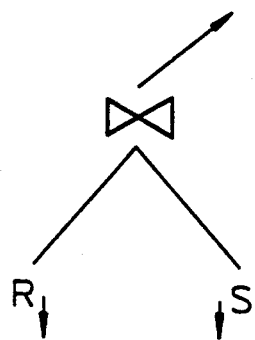
FIG. 6 shows an example of a subquery of the query shown in FIG. 5.
Figure 7:
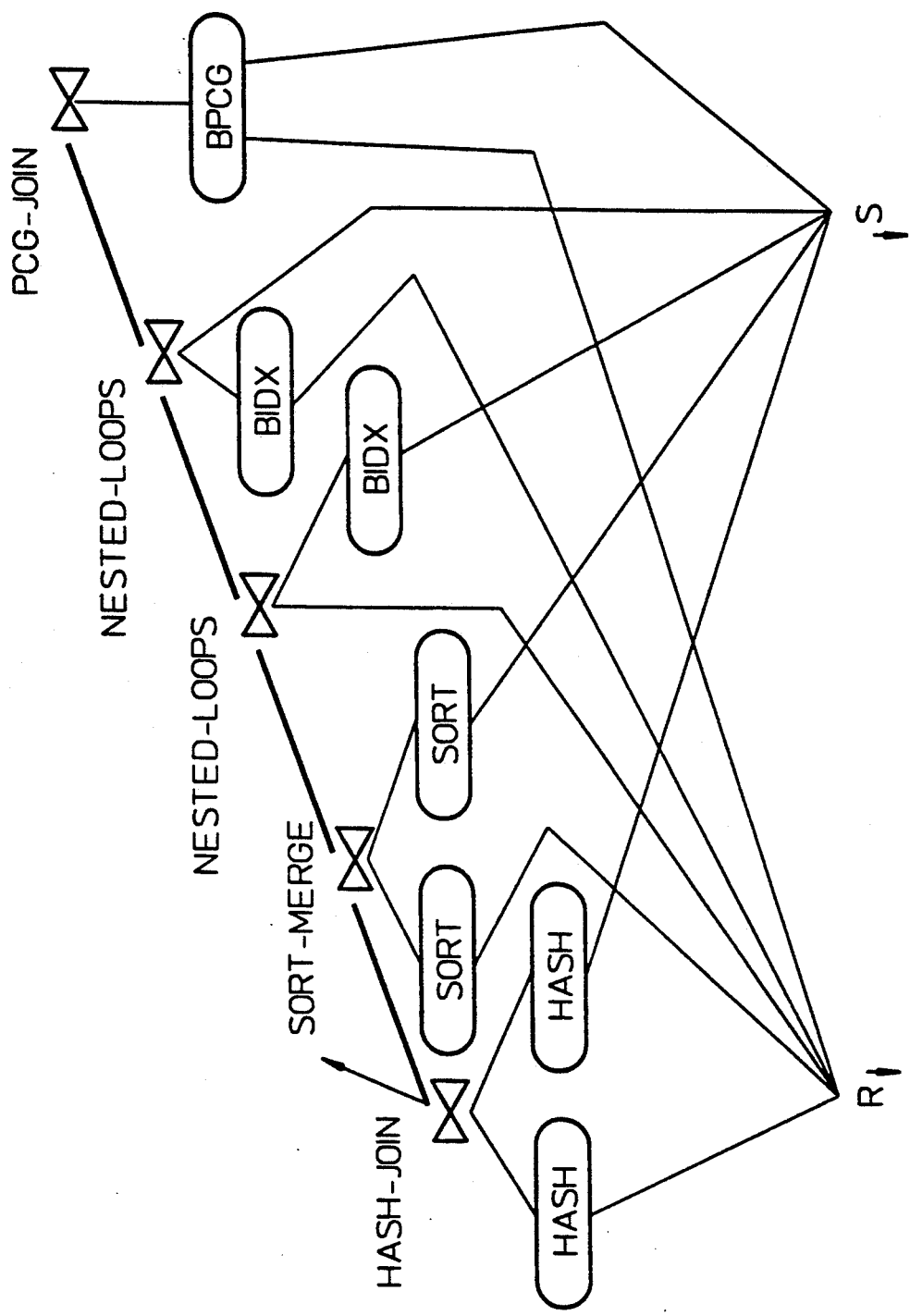
FIG. 7 shows the subquery of FIG. 6 after being expanded.

Each of the join nodes in the query plan shown in FIG. 5 is then expanded out (by means of rule 4) into a collection of possible 2-way joint processing strategies. The number of nodes increases greatly during this step. To avoid undue complexity, a simpler example is used for FIGS. 6 through 9. Subqueries, denoted by "R" and "S", remain unchanged and are referenced by all of the nodes in the expansion rather than being replicated for each node. The original subquery is shown in FIG. 6, and the subquery as expanded by using rule 4 is shown in FIG. 7.

Figure 8:
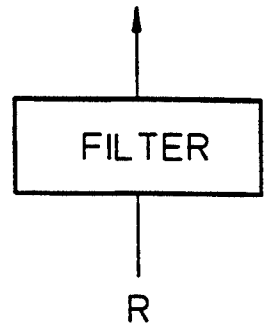
FIG. 8 shows another example of a subquery.
Figure 9:
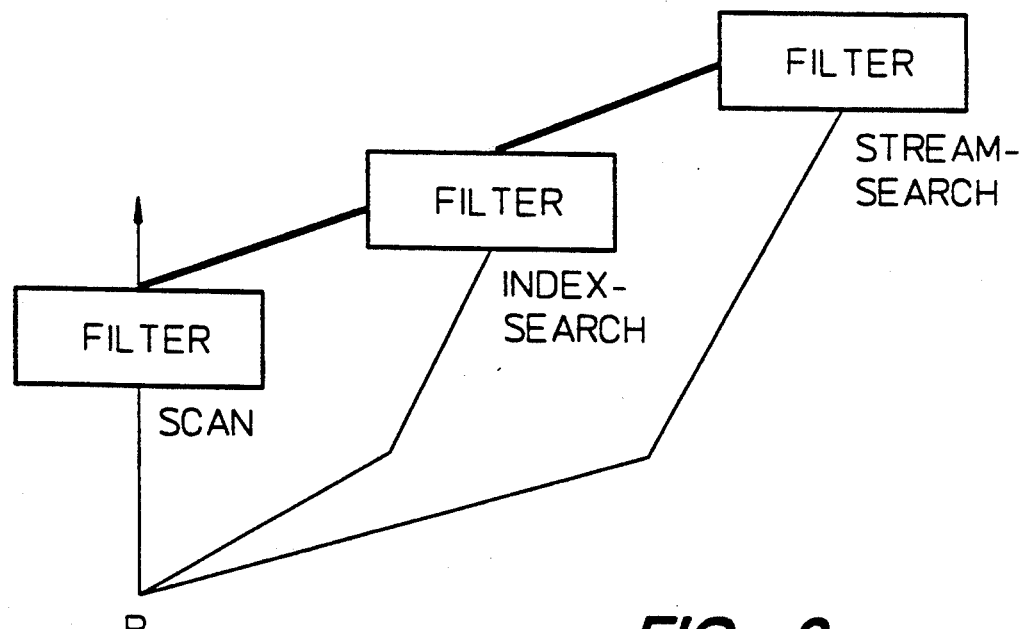
FIG. 9 shows the subquery of FIG. 8 after being expanded.

Nodes are expanded in a similar fashion using rule 5. FIG. 8 shows the original subquery and FIG. 9 shows the subquery after expansion by using rule 5.

Figure 10:
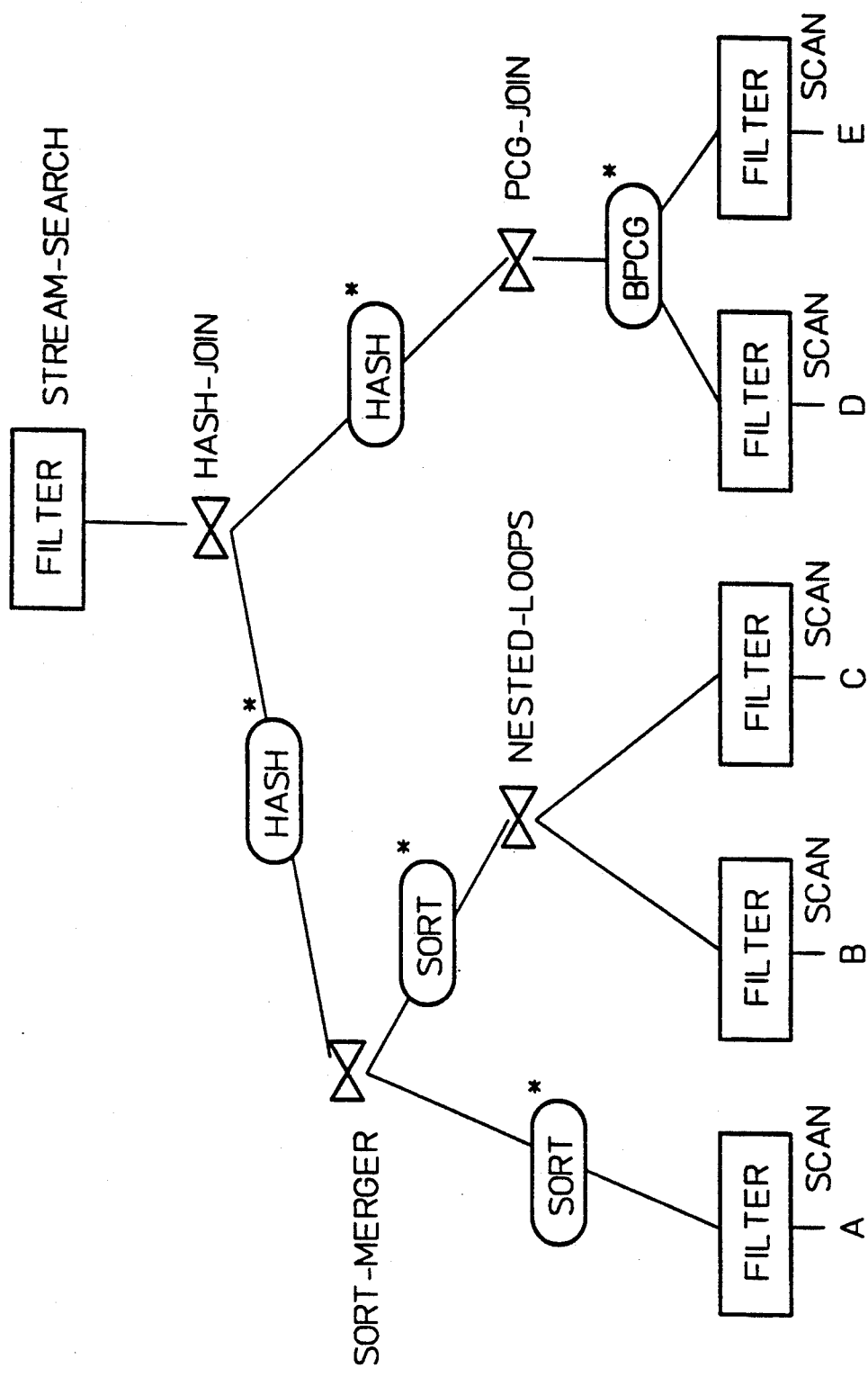
FIG. 10 shows an execution strategy for the query shown in FIG. 5.

The fully expanded tree represents a collection of execution strategies. Individual execution strategies result from selecting a single member from each set of nodes generated during application of rules 4 and 5. FIG. 10 illustrates one possible execution strategy for the sample query given above. In the figure, synch points are marked by an asterisk for future reference.

(b) Multiprocessor Cost Functions

In traditional query optimization, individual execution strategies are compared on the basis of their expected execution time. Execution time is usually estimated as a weighted sum of the amount of CPU time required and the number of (logical) disk I/O operations. In a distributed environment, the number of intermachine messages may be considered as well. These estimates assume that contention for computational resources is negligable. Important computational resources include disk bandwidth, memory buffers and CPU cycles. Contention increases execution time in two ways: queries may need to wait (block) for computational resources to become available; and the amount of processing performed may increase as work is repeated due to resource preemption (i.e. pages may need to be reread if the associated memory buffers are reclaimed before page accesses are complete). In this section we describe our metrics for comparing execution strategies in a multiprocessor environment as well as a collection of concrete cost formulas and algorithms for use during query optimization.

The goals of our multiprocessor query optimization techniques are to minimize the total execution time of queries as well as to minimize the computational resources required (within resource bounds defined by the underlying hardware and software system). As defined above, a multiprocessor system consists of D I/O paths (disks), M memory buffers, p processors and a collection of constants describing the times required to either read or process a page of data. The data is assumed to have a known and fixed distribution across the disks, and the values of the various times depend upon the underlying system hardware and software and are likewise fixed. The remaining computational resources (memory buffers and processors) are allocated to individual operators as part of the overall optimization process.

In order to minimize the execution time, we need to be able to computer how long various subqueries will take to execute in a bounded resource environment. Our approach to this problem is to first compute the minimum execution time using an unbounded number of resources, and then to compute the actual resource requirements. In general, if the execution time is increased above its minimum value, the computational resource requirements will decrease (subject to lower bound limits). If the total resource requirements for minimum time execution exceed the amount available, the target execution time is iteratively increased until the resource requirements are sufficiently small (or until lower bound limits are reached). This process requires three key cost formulas (for each LOLYPOP and GLUE algorithm):

(1) assuming infinite processors and buffers, compute the minimum subquery execution time;
(2) given a target subquery execution time, compute the number of processors required.
(3) given a target subquery execution time, compute the number of buffers required.

The following subsections present detailed cost functions for the specific LOLYPOP and GLUE algorithms described above. The relations participating in the algorithm are denoted by R1 and R2. The other parameters used in the cost function are defined as follows in Table I.

TABLE I

| | |
|---|---|
| B1 = | number of disk blocks in R1 |
| bf1 = | blocking factor for R1 (avg # tuples/disk bock) |
| k = | index fanout |
| i = | (index entry size)/(tuple size) |
| $T_r$ = | block read time (from disk) |
| $T_3$ = | block search time |
| $T_j$ = | page join time |
| s = | selectivity |
| H = | number of pages in hash bucket |
| H' = | number of pages in hash index bucket |

None of the cost functions given below include output buffers in the buffer counts. At least one additional buffer per processor producing output tuples is required (in order to avoid synchronization delays in coordinating writes to shared buffers). The cost evaluation algorithm given below computes the actual number of buffers required for output and includes this count in its overall subquery totals. In addition, most cost functions assume that $T_r^{eff}$ is larger than any of the page processing times ($T_r^{eff}$ is always greater than or equal to $T_r$, the minimum disk read time).

(b)(1) Initial Effective Disk Read Times $T_r$ is the time required to read a page of data from the disk into a memory buffer, including both the I/O and operating system processing times. If multiple subqueries are sharing the same disk, the value of $T_r$ is scaled to reflect the fraction of the total disk bandwidth actually available to each subquery. For example, if two subqueries which require the same amount of disk I/O are sharing a single disk, then each subquery has only half of the total disk bandwidth available. To model this, we scale up the read time, $T_r$, to an effective read time, $T_r^{eff}$, which is twice as long. The effective read time for each subquery is thus equal to the time between completions of successive read operations within that subquery, assuming a uniform distribution of disk accesses from each subquery during overall query execution.

Under more general data distributions, whenever two or more parallel operators share disks, the value of $T_r$ is scaled so that the total minimum read time on each disk for each operator is equal to the sum of the read times over all operators. Note that since each relation is distributed over a different subset of disks, this simple strategy may cause the effective disk I/O times for individual operators to become different on different disks. Since relations are partitioned, the overall computation cannot complete until the slowest disk completes transferring data into memory, and it is reasonable to scale down all of the disk I/O rates to match that of the slowest disk. When disk I/O rates are scaled down, some disk bandwidth could be released for use in other operators. For simplicity, we ignore this small increase in available bandwidth and assume that increasing a fragment I/O time above its minimum value has no effect on the minimum times of the other fragments.

To summarize:

Each relation is evenly partitioned among some subset of the disks. We assume that on each disk the number of pages of the relation participating in the query is equal to a constant, denoted by fragment(r).

For each disk, $d$:

$$\text{total\_time}(d) = \sum_{r \text{ a relation in the query}} \text{\# participating pages from } r \text{ on disk } d * T_r$$

For each relation, $r$:

$$\text{max\_time}(r) = \max_{d \text{ a disk containing pages from } r} \text{total\_time}(d)$$

$$T_r^{eff}(r) = \text{max\_time}(r) / \text{fragment\_size}(r)$$

(b) (2) Select-Project Scan Filter

The select-project filter operation is a relational select operation immediately followed by a relational project operation. A total of $T_s$ time units are required to complete both operations on a single page of data. The data is evenly partitioned over $k$ disks with an effective read time of $T_r^{eff}$. There are a total of $B1$ pages of data and no supporting index structure.

The minimum execution time is equal to the amount of time required to read all of the data in from disk, then to process the last page read:

$$(1) \quad T_{min} = \left\lceil \frac{B1}{k} \right\rceil \times T_r^{eff} + T_s$$

If all $k$ disks are active, then $2k$ buffers are needed ($k$ for the next disk reads, and $k$ to hold the previous pages read). The number of buffers needed decreases as the amount of disk bandwidth allocated to the computation decreases. Let the actual number of buffers allocated be $M'$. During filter processing, half of these buffers are used to read from disks (accessed in round robin fashion), and the other half to process buffer resident pages. All buffer resident pages are processed during the immediately following read step. The total number of read/process cycles is $B1/(M'/2) + 1 = (2 \times B1 + M')/M'$, and the time per cycle is $T_r^{eff}$ (the first cycle has no select-project operations and the final cycle has no read operations). The total processing required per cycle is $(M'/2) \times T_s$ time units, and if $p'$ processors are allocated, the amount of processing time available is $p' \times T_r^{eff}$. Equating these quantities and solving for $p'$ results in:

$$p' = \frac{M' \times T_s}{2 \times T_r^{eff}}$$

The total time required, $T'$, is equal to number of cycles multiplied by the time per cycle:

$$T' = \left\lceil \frac{2 \times B1}{M'} \right\rceil \times T_r^{eff} + T_r^{eff}$$

If the total time is fixed at some value $T$ ($T >= T_{min}$), the number of buffers required is calculated by rearranging this equation:

$$(2) \quad M'(T) = \frac{2 \times B1 \times T_r^{eff}}{T - T_r^{eff}}$$

Given this number of buffers, the number of processors can be calculated by substituting for $M'$ in the equation for $p'$:

$$(3) \quad p'(T) = \frac{B1 \times T_s}{T - T_r^{eff}}$$

(b)(3) Index Search

This section presents the three key cost functions for a single search operation supported by a multi-disk index. This processing directly implements a select-project operation (with a simple equality condition), and also serves as a primitive for the nested-loops join algorithm. All of the cost functions assume that the duplication factor is small, so that the result of a search on a single value resides on a single data page. In pipeline mode buffers are shared with the output of the previous operator, however buffers are not actually accessed until output is complete (to avoid the overhead of synchronizing buffer access).

(1) SB-Index Search (1) min_time = time to read & search index + time to read and search clustered data.

$$= \left\lceil \log_i(i \times B1) \right\rceil \times (T_r^{eff} + T_s) + \left\lceil \frac{s \times B1}{k} \right\rceil \times T_r^{eff} + T_s$$

(2) buffers = 1 during index search

-continued $$= \frac{2 \times s \times B1 \times T_r^{eff}}{T - T_r^{eff}} \quad \text{during data search}$$

(3) processors = 1 during index search $$= \frac{s \times B1 \times T_s}{T - T_r^{eff}} \quad \text{during data search}$$

(2) Primary Spanning Hash (1) min_time = time to read $k$ hash buckets and search
$$= H \times T_r^{eff} + T_s$$

(2) buffers $= \dfrac{2 \times k \times H \times T_r^{eff}}{T - T_r^{eff}}$ (3) processors $= \dfrac{k \times H \times T_s}{T - T_r^{eff}}$

(3) Secondary Spanning Hash (1) min_time = time to read & search hash index +
time to read and search unclustered data $$= H' \times T_r^{eff} + T_s + \left\lceil \frac{s \times B1 \times bf1}{k} \right\rceil \times T_r^{eff} + T_s$$

(2) buffers $= \dfrac{2 \times s \times B1 \times bf1 \times T_r^{eff}}{T - T_r^{eff}}$ during data search (3) processors $= \dfrac{s \times B1 \times bf1 \times T_s}{T - T_r^{eff}}$ during data search

(4) SB Join Index (1) min_time to read and search $SB$-join index +
time to read and search unclustered data $$= \left\lceil \log_i(i1 \times B1 + i2 \times B2) \right\rceil \times (T_r^{eff} + T_s) + \left\lceil \frac{s \times B1 \times bf1}{k} \right\rceil \times T_r^{eff} + T_s$$

(2) buffers = 1 during index search
$$\frac{2 \times s \times B1 \times bf1 \times T_r^{eff}}{T - T_r^{eff}} \quad \text{during data search}$$

(3) processors = 1 during index search
$$\frac{s \times B1 \times bf1 \times T_s}{T - T_r^{eff}} \quad \text{during data search}$$

(5) Stream-Search:

K' = number of processors producing output tuples
$T_o^{eff}$ = actual time to produce next page of input tubles (1) min_time = $T_s$ + time to produce input tuples (2) buffers $= \dfrac{B1 \times T_s}{T - T_o^{eff}}$ -continued (3) processors $= \dfrac{2 \times B1 \times T_o^{eff}}{T - T_o^{eff}}$

(b)(4) Join

This section presents the three key cost functions for the parallel join algorithms described above. In all cases, any necessary supporting multi-disk structures are assumed to already exist (we assume the existance of parallel algorithms for dynamic multi-disk index structure creation).

(1) Hash Join (1) min_time $= \left( \left\lceil \dfrac{B1}{k} \right\rceil = \left\lceil \dfrac{B2}{k} \right\rceil \right) \times T_r^{eff} T_j$ (2) buffers $= k(2H + 1)$ This is enough to keep 2 buckers in memory from each disk, plus k buffers for the first reads in the next bucket.

(3) processors $= \dfrac{k \times H \times T_j}{2 \times T_r^{eff}}$

This is enough to complete H² page joins in 2H read-steps for each of the k disks-it ignores the piperlining that is actually taking place among buckets, the effects of pipelining will be small unless the number of buckets is very small. If fewer processors are available, the read times can be increased in order to balance the processing times. If fewer buffers are available, the simple algorithm given here will not work.

(2) Merge Join

Assume (optimistically) that the number of duplicate values is very small and that the data is randomly distributed across the disks. In this case, pages from each disk will be consumed at approximately the same rate. The reads should be balanced so that k pages can be merged during the time that the next k pages are being read. The merge operation cannot be performed if fewer than k pages are in memory, so this algorithm does not scale down in a limited resource environment. Let Tm(k) be the time to merge k pages using one processor (this operation might be effectively parallelized using the "tree-of-losers" strategy given in Knuth, however the synchronization costs probably outweight the time savings).

(1) min_time: $\left\lceil \dfrac{B1}{k} \right\rceil \times T_r^{eff} + T_m(k)$ (2) buffers: $2k$ (3) processors: 1

This assumes $T_m(k) < T_r^{eff}$. If this is not the case then the time formula should be in terms of $T_m(k)$ instead of $T_r^{eff}$.

(3) Nested Loops Join

Four variants of the nested loops join algorithm are described above. They differ in the degree to which the outer relation is processed in parallel. The first variant processes the outer relation sequentially, the last variant reads k blocks of the outer in parallel then processes all the tuples read in parallel.

a. Process one outer block tuple by tuple

Scan outer relation block by block, then search inner relation tuple by tuple.

(1) min_time = $B1 = T_r^{eff} + (B1 \times bfl) \times search(B2)$ (2) buffers = 1 + buffers-search($B2$)

(3) processors = processors-search($B2$)

b. Process one outer block, block by block

Scan outer relation block by block, then search on all tuples in outer block in parallel.

(1) min_time = $B1 \times T_r^{eff} + (B1) \times search(B2)$ (2) buffers = $1 + bfl \times$ buffers-search($B2$)

(3) processors = $bfl \times$ processors-search($B2$)

c. Process k outer blocks, tuple by tuple

Scan k outer blocks in parallel, then search on outer tuples one by one.

(1) min_time: $\left\lceil \dfrac{B1}{k} \right\rceil \times T_r^{eff} + \left\lceil \dfrac{B1}{k} \right\rceil \times bfl \times$ search($B2$)

(2) buffers: $k + k \times$ buffers-search($B2$)

(3) processors: $k + k \times$ processors-search($B2$)

d. Process k outer blocks, block by block

Scan k outer blocks in parallel, then search on all tuples in every outer block in parallel (1) min_time: $\left\lceil \dfrac{B1}{k} \right\rceil \times T_r^{eff} + \left\lceil \dfrac{B1}{k} \right\rceil \times$ search($B2$)

(2) buffers: $k + k \times bfl \times$ buffers-search($B2$)

(3) processors: $k + k \times bfl \times$ processors-search($B2$)

(3) processors: $k + k \times bfl \times$ processors-search(B2)

(4) PCG Join (1) min_time: $\left\lceil \dfrac{B1 + B2}{k} \right\rceil \times T_r^{eff} + T_j$ (2) buffers: $.80 \times (B1 + B2)$ This is a heuristic based on simulation experiments.

(3) Processors: $\dfrac{T_j}{T_r^{eff}} \max \left\{ \dfrac{|E|}{t} : k \dfrac{|V| - \sqrt{|V|^2 - 4|E|}}{2} \right\}$ where $V = B1 + B2$, $E =$ the number of edges in the page connectivity graph and $t = \left\lceil \dfrac{|V|}{k} \right\rceil - 1 + \dfrac{T_j}{T_r^{eff}}$.

This is a heuristic based on simulation experiments, the value is the lower bound number of processors.

This algorithm should not be used if insufficient buffers are available (the performance degrades badly with many pages re-read during execution). If insufficient processors are available, the disk I/O's need to be made slower, it is not clear how to quantity this. In addition, the value of E is not known prior to PCG generation and must be estimated based on the known selectivity values and whether or not the tuples are clustered by join attribute value.

(c) Expansion Strategy

The expansion strategy determines the order in which query execution plans are generated and evaluated during query optimization. In a traditional uniprocessor environment, all of the resources required for subquery execution can be estimated immediately as soon as all of the processing algorithms have been identified. This allows rule expansion to be combined with cost evaluation in a straightforward manner: rules are expanded using a depth-first strategy and as soon as a subquery has been completely specified its associated resource requirements are evaluated. When several equivalent processing alternatives exist for a single node, all but the least expensive can be discarded immediately. This significantly reduces the number of different plans that must be considered by the optimizer in order to identify the minimum cost execution strategy.

The multiprocessor expansion strategy is complicated by two factors. First, while the minimum cost execution strategy assuming infinite resources can be calculated using a simple strategy analogous to that described above, resource balancing requires several iterations over a completely specified execution plan. At least two iterations are needed to estimate the buffer and processor requirements: one to determine the subquery target times and one to compute the resource requirements. Second, it is usually not possible to eliminate any alternative strategies until the entire plan is completely balanced. This is a consequence of the form of the cost functions: as the target execution time is increased, the different algorithms scale down their resource requirements at different rates, making it impossible to eliminate any execution strategies prior to evaluation at the final target time.

In this section we describe the major components of the multiprocessor expansion strategy. Initially a family of candidate execution strategies is generated by selectively expanding out the root-star. Each of these execution strategies is then balanced by first executing Algorithm 1 to compute the minimum execution time, then executing Algorithm 2 to balance the allocation of resources to subqueries and to calculate the total computational resource requirements. If this total is within the system resource bound, the expansion terminates. If it is not, a target execution time (which is greater than the minimum time computed by Algorithm 1) is determined, the query is rebalanced, using Algorithm 2 again, and the resource requirements recalculated. This step is iteratively performed until the resource requirements are within the system resource bounds or at their lower bound limit. After all of the candidate execution strategies have been balanced to execute within the system resource bounds (insofar as possible), the optimizer selects the minimum time one for execution.

(c)(1) Estimating the Minimum Query Execution Time

The cost functions given above provide a means to estimate the computational resource requirements for queries consisting of a single relational operator. Subqueries, as defined above, consist of a synch point preceeded by one or more pipelined sequences of relational operators. Each pipelined sequence thus begins with an operator which directly accesses the disk. The minimum duration of a subquery is equal to the maximum duration along any of the pipelined sequences of operators. The duration of a pipelined sequence of operators is limited by the time required for the slowest operator in the sequence. Typically this will be one of the operators which directly accesses the disk. The overall query consists of a partially ordered collection of subqueries. The minimum query duration is equal to the maximum duration along any sequence of subqueries.

The data structures representing the query execution strategy include information at each node specifying not only the computational algorithm, but a collection of parameters describing the important properties of the output produced. In a standard Starburst-style optimizer, these properties include the order in which tuples are produced, the cardinality of the result and the cost associated with executing the subquery rooted at that node. We have generalized these properties and added additional variables to be used during cost estimation and balancing. We consider the output storage structure of a stream filter to be identical to that of the input storage structure. This allows generalization of the order property to include any possible storage structure. For convenience in cost estimation, the output cardinality is expressed in units of pages rather than tuples. Finally, rather than quantifying the resource requirements using a single numeric cost value, we maintain all three resource allocations explicitly. These include the abount of execution time allocated to the subquery in a balanced execution as well as the number of buffers and processors.

Lolypop/Glue property vector:
structure: storage structure of subquery result (heap, stream, ordered stream, hash, sort, pcg, index)
pcard: number of pages in subquery result
target: target time to process this node in a balanced query
buffers: number of memory buffers required
processors: number of processors required Algorithm 1, presented in Table II, accepts an execution plan as input and produces an estimate of the minimum execution time, given an unbounded number of processors and buffers. Of course, the actual resource allocations have trivial upper bounds of one memory buffer for each disk page participating in the querr and one processor for each page operation. These bounds do not affect the results presented here.

(c)(2) Allocating Computational Resources

Algorithm 1 estimates the minimum time for an execution plan under an assumption of unbounded resources. In order to estimate the associated processor and buffer requirements, each of the nodes must be assigned a target execution time. This is done using execution plan balancing, as described above. Each subquery is assigned a target duration, and each node within a subquery is assigned a target execution time. As soon as target times are assigned, the associated resource requirements are calculated using cost formulas (2) and (3). When a subquery is assigned a target duration that is greater than its minimum duration, both the subquery duration and the durations of the preceeding subqueries are scaled up proportionately. All preceeding subqueries are assigned target durations equal to that of the longest subquery. All pipelined nodes within a subquery are assigned a target time equal to that of the longest node in the pipeline (possibly scaled up).

Algorithm 2, presented in Table III, balances an execution plan so that it will complete execution in some overall target time with a minimum allocation of computational resources. It accepts as input an execution plan and an overall target time and produces as output an execution plan annotated with node resource allocations and a cumulative total allocation of resources.

Evaluating the resource requirements at each node includes two components: estimating the resources required to complete executing the current node within the target execution time and estimating the cumulative requirements up to and including the current node. The first component requires a straightforward application of cost formulas (2) and (3). The second component requires consideration of the type of node. For pipelined subqueries, the cumulative resource requirements are the sum of the requirements for the individual nodes making up the pipeline. As soon as the subquery synch point completes execution, however, all of the resources are released. For queries containing sequences of subqueries, the cumulative resource requirements are estimated as the maximum requirements for any of the subqueries in the sequence.

TABLE II
"Algorithm 1"

calc_min_time(Node)
{   1. For each descendent of Node, call calc_min_time(i.e. perform a postorder traversal of the execution plan)
    2. Calculate the minimum node execution time using cost formula (1) and
       $T_o^{eff}$ of the descendent nodes as $T_r^{eff}$.
    3. case (node.type) of
    synch_point {
        a. Calculate the current node duration as the maximum duration over all of the descendent nodes plus the minimum execution time of the current node. The duration of a descendent node is
        equal to the largest synch point duration in the associated pipeline plus the maximum node execution time in that pipeline.

b. Calculate the maximum node execution time for the subquery as the maximum node execution time over all of the pipelines associated with descendent nodes.} pipe_node { a. Calculate the maximum node time in the pipeline as the maximum node time over the current node and all pipelines associated with descendent nodes.

b. Calculate the time since the last synch point as the maximum over all descendent nodes of the time since the last synch point.

c. Calculate $T_o^{eff}$ for the node as the ratio of the maximum node time in the pipeline to the output cardinality of the current node.}
}

TABLE III

"Algorithm 2"

balance (node,target duration of subquery, target node execution time for the current subquery)

{
  case (node.type) of:

relation {
    a. Calculate the effective output time as the ratio of the target execution time and the relation cardinality.} synch_point {
    a. Set the target subquery duration for this node equal to the value of the target duration parameter.
    b. Compute a scaling factor as the ratio of the target duration to the minimum duration.
    c. Compute the target pipeline execution time as the product of the maximum node execution time within the pipeline and the scaling factor.
    d. Compute the target duration for all preceeding subqueries as the duration of the current subquery less the pipeline execution time. For each preceeding subquery, balance(subquery, target duration, target pipeline execution time)
    e. Evaluate the resorce requirements of the current node.} pipe_node{
    a. Compute the target duration of the current node as the target subquery duration less the target node execution time.
    b. Compute the effective output rate as the ratio of the target node execution time and the node output cardinality.
    c. For each subquery, balance(subquery, subquery duration, target pipeline execution time).
    d. Evaluate the resource requirements of the current node.}
}

(c)(3) Balancing Algorithms

The goal of execution plan balancing is to produce a parallel execution plan which completes in minimum time within given bounds on the total number of processors and buffers required. If the minimum time execution plan obtained using the minimum time computed using Algorithm 1 as a target time for Algorithm 2 has resource requirements which exceed the given bounds, the total execution time is increased and the execution plan rebalanced. This process continues until the total resource requirements are within the given bounds (or until no further decrease in resources results from increasing the target time). One possible heuristic for adjusting the total execution time is to scale the previous value by the ratio of the resources it required to the resources available. Algorithm 3 uses this algorithm. It takes as input an execution plan and bounds on the number of processors and buffers and produces either a target execution time or an indication that no such time exists. Algorithm 3 is presented in Table IV.

(d) Heuristics to Reduce the Optimizer Search Space

The algorithms discussed in the previous section allow individual execution plans to be optimized in order to complete in minimal time within the given resource bounds. In order to perform a complete optimization, all of the execution plans in the space defined by the expansion rules must be optimized and the overall minimum cost one selected. The number of execution plans is factorial in the number of relations in the query. In order to make optimization computationally feasible, the number of candidate plans must be reduced to a more manageable number. Since cost estimation requires multiple passes over the execution plan, pruning non-optimal strategies during plan generation is not possible.

We consider two heuristics to reduce the number of execution plans considered. First, only "linear" queries with a fixed join order are considered. The expansion rules explicitly specify how to express these queries in terms of 2-way joins and execution plans involving cartesian products are not considered. The number of different plans considered can be further reduced by limiting the number of different STAR expansions that are actually performed so that only a single representative expansion for each structural class is produced (i.e. one right-linear, one balanced and one left-linear expansion). Although this heuristic will substantially reduce the number of candidate plans, it is unclear whether or not the quality of the optimal plan generated (relative to that from a complete optimization) will be significantly compromised.

TABLE IV

"Algorithm 3"

bound_resources(execution plan, processor bound, buffer bound)

{

1. Use Algorithm 1 to compute the minimum query execution time.

2. Set the query target time equal to the minimum query execution time.

3. Use Algorithm 2 to compute the total resources required for the minimum cost query.

4. While (total resources rquired > resource bounds){ a. Compute new target time = old target time × (old buffer requirement + old processor requirement)/ (system bound on buffers + system bound on processors).

b. Use Algorithm 2 compute the resource requirements using the new target time. If the new resource requirements are unchanged from the old, return (failure).

} return(target time)

}

EXPERIMENTAL RESULTS

A prototype optimizer embodying the principles of the invention was implemented and a sequence of experiments was executed. The prototype optimizer, which uses Algorithms 1, 2 and 3 described above, accepts as input an execution plan represented as binary tree, a data distribution profile indicating how large each relation is and over which disks it is partitioned, and bounds on the maximum numbers of processors and buffers.

The overall result of query optimization is an execution plan—a partial ordering of the relational algebra operators making up the query, along with the computational algorithm to use for each operator in the plan. In the partial ordering sequence, nodes follow all of their descendants.

Figure 11:
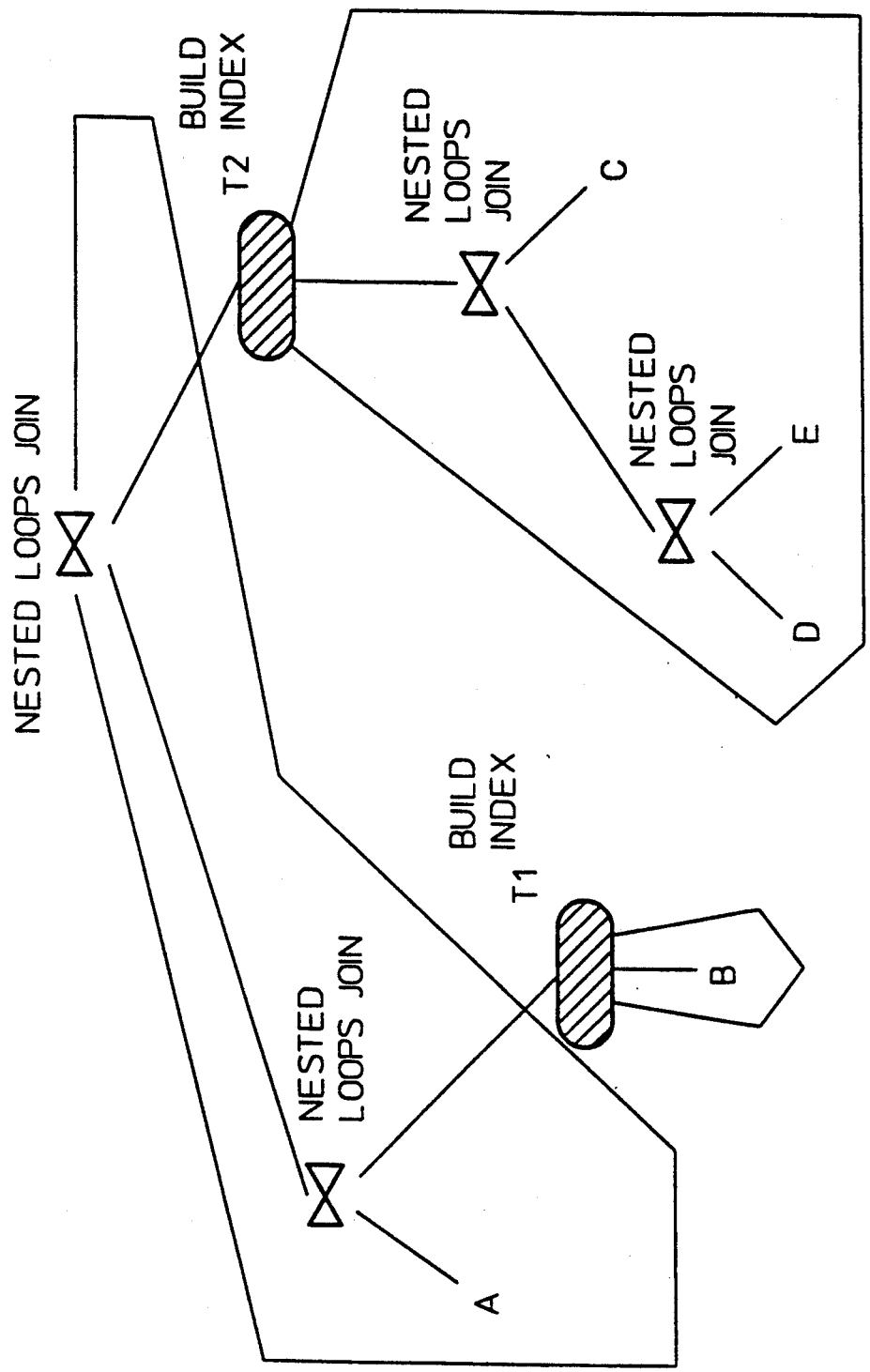
FIG. 11 shows an example of a query execution plan developed according to the method of the invention.

The experiments were based on an example query execution plan (query tree) containing four nested loop joins and two restructuring operators. These restructuring operators build B+-tree indices on the associated input tuples. The result of restructuring a collection of tuples is a temporary relation with the associated storage structure shown in FIG. 11 as T1 and T2. Table V summarizes the parameter values that were used.

TABLE V

| | | |
|---|---|---|
| M | max memory buffers | 100 |
| p | max processors | 16 |
| D | total disks | 5/175 |
| $T_r$ | page read time | 30 ms |
| $T_s$ | page search/scan time | 10 ms |
| $T_{sort}$ | page sort time | 25 ms |
| s | join selectivity | 0.005 |
| bf | blocking factor | 20 |
| f | index fanout | 40 |
| i | index entry/tuple size | 0.2 |

It was assumed that relations A through E have page cardinalities of 500, 250, 1000, 750 and 300, respectively. The experiments included three distributions of data over the disks. First it was assumed that all relations and temporary relations were distributed evenly across all five disks. In this case, disk I/O parallelism is maximized but there is a substantial effect from disk bandwidth contention. Effective disk access times are calculated as described above. As can be seen from Table VI, disk I/O is slowed down by a factor of 2-26 as a result of this contention.

TABLE VI

| Relation | Effective Read Time |
|---|---|
| A | 13 $T_r$ |
| B | 9 $T_r$ |
| C | 2 $T_r$ |
| D | 3 $T_r$ |
| E | 8 $T_r$ |
| T1 | 26 $T_r$ |
| T2 | 1 $T_r$ |

Second, it was assumed that relations and temporary relations are partitioned over five disks in such a way that there is no disk bandwidth contention, that is, parallel subqueries access different disks. In this case the effective disk access time is equal to the disk read time. Table VII describes the partitioning that was used.

TABLE VII

| Relation | Disk |
|---|---|
| A | 1 |
| B | 1 |
| C | 2, 3 |
| D | 4 |
| E | 5 |
| T1 | 2 |
| T2 | 3, 4, 5 |

In the third experiment the number of available disks was increased so that each relation had a partition size of 50 pages and no disk bandwidth contention with other subqueries.

In all three experiments described above, the number of processors was equal to the lower bound, 10, at the minimum query execution time (as estimated by Algorithm 1). The number of buffers varied slightly from 40 in the first experiment to 32 in the second and 33 in the third. In all cases it was well within the multiprocessor system limits we assumed. The only performance metric to show a substantial change was the query duration (response time). In the three experiments above, the estimated query duration was equal to 20,324,732, 12,698,250 and 2,394,250. We ran additional experiments under a variety of relation sizes and obtained similar results.

These results indicate that disk bandwidth is a critical system resource for complex parallel queries utilizing the simple parallel nested loop join algorithm as described above. As disk bandwidth contention is decreased by redistributing the data and/or increasing the number of disks, the response time decreases. All of the other system resource allocations are at or near their lower bounds and cannot be reduced further without modifying the computational algorithms. Increasing the allocations of these resources will have no effect on query duration. In addition, for complex queries over moderately large relations (as in the example), only a limited number of processors and buffers can be utilized effectively.

From the foregoing it will be apparent that the method of the invention provides an efficient way to allocate resources such as processors and memory buffers to subtasks in a parallel computer system so as to efficiently execute the task.

Although a specific embodiment of the invention has been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

We claim:

1. A method of automatically controlling the operation of a computer system to execute a task, the computer system being of the kind that has a plurality of simultaneously operable resources, the task being of the kind that has a plurality of subtasks more than one of which could be executed simultaneously given enough resources, the method comprising the following steps executed automatically in the computer:
    (a) calculating a minimum execution time that would be required to execute the task assuming the computer system has enough resources to simultaneously perform all the subtasks that could be performed simultaneously;
    (b) preparing a subtask-resource schedule in which it is assumed that each said subtask will be provided with whatever resources would be necessary to execute that subtask such that adherence to the schedule would result in executing the task in the minimum execution time;
    (c) determining how many resources would be required to satisfy the subtask-resource schedule;
    (d) determining whether the computer system has the number of resources determined in the preceding step;
    (e) responsive to a determination in the preceding step that the computer system has said number of resources, assigning the resources to the subtasks according to the subtask-resource schedule; and responsive to a determination in the preceding step that the computer system does not have said number of resources, (1) calculating a revised execution time that has a longer duration than the minimum execution time, (2) adjusting the subtask-resource schedule by reducing the number of resources such that adherence to the adjusted schedule would result in executing the task in the revised execution time, (3) determining how many resources would be required to satisfy the adjusted schedule, and (4) looping back to step (d) to perform steps (d) and (e) again.

2. A method according to claim 1 wherein calculating the minimum execution time in step (a) comprises determining a critical path of substeps which must be executed sequentially, each such substep comprising one or more of the subtasks, determining the minimum time to execute each such substep if there were enough resources to execute all subtasks of that substep simultaneously, and summing the minimum times to get the minimum execution time.

3. A method according to claim 1 wherein calculating a revised execution time in step (e)(1) comprises forming a time scaling factor by taking the ratio of the number of resources that are available and the number of resources that are required, and scaling the execution time by the scaling factor to obtain the revised execution time.

4. A method according to claim 1 wherein a plurality of simultaneously operable resources comprises a plurality of processors and a plurality of memory buffers.

5. A method according to claim 4 wherein calculating a revised execution time in step (e)(1) comprises:
   calculating an equivalence factor between processors and buffers,
   using the equivalence factor to calculate a first number representative of the numbers of processors and buffers that are available and a second number representative of the requisite numbers of processors and buffers,
   forming a time scaling factor by taking the ratio of the first and second numbers, and
   scaling the execution time by the scaling factor to obtain the revised execution time.

6. A method of automatically controlling the operation of a computer system to evaluate a query, the computer system being of the kind that has a plurality of memory buffers, a plurality of processors, a plurality of storage devices, and a plurality of pages of data in the storage devices, the system characterized by a minimum page transfer time required to transfer a page of data from a storage device into a memory buffer, the query being of the kind that has a plurality of subqueries more than one of which could be executed simultaneously given enough resources, the method comprising the following steps executed automatically in the computer:
   (a) providing a plan for evaluating the query;
   (b) calculating a minimum evaluation time that would be required to evaluate the query according to the plan in consideration of the minimum page transfer time assuming the computer system had enough processors and buffers to simultaneously evaluate all the subqueries that could be evaluated simultaneously according to the plan;
   (c) preparing a schedule of subqueries to processors and buffers in which schedule it is assumed that each subquery will be provided with whatever processors and buffers would be necessary to evaluate that subquery such that adherence to the schedule would result in evaluating the query in the minimum evaluation time;
   (d) determining how many processors and how many buffers would be required to satisfy the schedule;
   (e) determining whether the computer system has the number of processors and buffers determined in the preceding step; and
   (f) responsive to a determination in step (e) that the computer system has said number of processors and buffers, assigning the processors and buffers to the subqueries according to the schedule; and responsive to a determination in step (e) that the computer system does not have said number of processors and buffers:
      (1) calculating a revised evaluation time that is longer than the minimum evaluation time,
      (2) adjusting the schedule by reducing the number of processors and buffers such that adherence to the adjusted schedule would result in evaluating the query in the revised evaluation time,
      (3) determining how many processors and buffers would be required to satisfy the adjusted schedule, and
      (4) looping back to step (e) to perform steps (e) and (f) again.

7. A method according to claim 6 wherein calculating the minimum evaluation time in step (b) comprises determining a critical path of partial queries which must be evaluated sequentially, each such partial query comprising one or more of the subqueries, determining the minimum time to evaluate each such partial query if there were enough resources to execute all portions of that partial query simultaneously, and summing the minimum times to get the minimum execution time.

8. A method according to claim 6 wherein calculating a revised evaluation time in step (f)(1) comprises:
   calculating a first number representative of the numbers of processors and buffers that are available and a second number representative of the requisite numbers of processors and buffers; forming a time scaling factor by taking the ratio of the first and second numbers; and scaling the evaluation time by the scaling factor to obtain the revised evaluation time.

9. A method according to claim 8 and further comprising calculating an equivalence factor between processors and buffers and using said equivalence factor to calculate the first and second numbers.

10. A method of automatically controlling the operation of a computer system to evaluate a query, the computer system being of the kind that has a plurality of memory buffers, a plurality of processors, a plurality of storage devices, and a plurality of pages of data in the storage devices, the system characterized by a minimum page transfer time required to transfer a page of data from a storage device into a memory buffer, the query being of the kind that has a plurality of subqueries more than one of which could be executed simultaneously given enough resources, the method comprising the following steps executed automatically in the computer:
   (a) providing a plan for evaluating the query;
   (b) calculating a minimum evaluation time that would be required to evaluate the query according to the plan in consideration of the minimum page transfer time assuming the computer system had enough processors and buffers to simultaneously evaluate all the subqueries that could be evaluated simultaneously according to the plan;
   (c) preparing a schedule of subqueries to processors and buffers in which schedule it is assumed that each subquery will be provided with whatever processors and buffers would be necessary to evaluate that subquery such that adherence to the schedule would result in evaluating the query in the minimum evaluation time;

(d) determining how many processors and how many buffers would be required to satisfy the schedule;

(e) determining whether the computer system has the number of processors and buffers determined in the preceding step; and (f) responsive to a determination in step (e) that the computer system has said number of processors and buffers, assigning the processors and buffers to the subqueries according to the schedule; and responsive to a determination in step (e) that the computer system does not have said number of processors and buffers:

(1) calculating a revised evaluation time that is longer than the minimum evaluation time, (2) adjusting the schedule by reducing the number of processors and buffers such that adherence to the adjusted schedule would result in evaluating the query in the revised evaluation time, (3) determining how many processors and buffers would be required to satisfy the adjusted schedule, (4) determining whether the computer system has the number of processors and buffers determined in the preceding substep, (5) responsive to a determination in substep (4) that the computer system has said number of processors and buffers, assigning the processors and buffers to the subqueries according to the adjusted schedule, (6) responsive to a determination in substep (4) that the computer system does not have said number of processors and buffers, determining whether the number of processors and buffers determined in substep (3) is smaller than the number of processors and buffers determined in any previous iteration of step (d) and of substep (3), and, if not, assigning the subqueries according to the adjusted schedule to as many processors and buffers as are available for parallel execution, (7) responsive to a determination in substep (4) that the computer system does not have said number of processors and buffers and responsive to a determination in substep (6) that the number of processors and buffers determined in substep (3) is smaller than the number of processors and buffers determined in any substep (3) is smaller than the number of processors and buffers determined in any previous iteration of step (d) and of substep (3), looping back to step (f)(1) to perform steps (f)(1) through (f)(7) again.

11. A method according to claim 10 wherein calculating the minimum evaluation time in step (b) comprises determining a critical path of partial queries which must be evaluated sequentially, each such partial query comprising one or more of the subqueries, determining the minimum time to evaluate each such partial query if there were enough resources to execute all portions of that partial query simultaneously, and summing the minimum times to get the minimum execution time.

12. A method according to claim 10 wherein calculating a revised evaluation time in step (f)(1) comprises:

calculating a first number representative of the numbers of processors and buffers that are available and a second number representative of the requisite numbers of processors and buffers;

forming a time scaling factor by taking the ratio of the first and second numbers; and scaling the evaluation time by the scaling factor to obtain the revised evaluation time.

13. A method according to claim 12 and further comprising calculating an equivalence factor between processors and buffers and using said equivalence factor to calculate the first and second numbers.

* * * * *